(12) United States Patent
Spirk et al.

(10) Patent No.: US 12,342,835 B2
(45) Date of Patent: Jul. 1, 2025

(54) FROZEN DESSERT DISPENSING MACHINE AND CARTRIDGE

(71) Applicant: POLAR DELIGHT, INC., Cleveland, OH (US)

(72) Inventors: Evan Spirk, Cleveland, OH (US); Gary Stephan, Cleveland, OH (US); Richard Klink, Cleveland, OH (US); Marc Vitantonio, Cleveland, OH (US); Jason Ertel, Cleveland, OH (US); David Pehar, Cleveland, OH (US); Robert Vystrcil, Cleveland, OH (US); Brad Briscoe, Cleveland, OH (US); Mark Cipolla, Cleveland, OH (US); Donald Fuchs, Cleveland, OH (US); Ben Parker, Cleveland, OH (US); William Sebastian, Cleveland, OH (US); Alexander Velet, Cleveland, OH (US)

(73) Assignee: POLAR DELIGHT, INC., Cleveland, OH (US)

( * ) Notice: Subject to any disclaimer, the term of this patent is extended or adjusted under 35 U.S.C. 154(b) by 0 days.

(21) Appl. No.: 18/654,130

(22) Filed: May 3, 2024

(65) Prior Publication Data

US 2024/0306665 A1 Sep. 19, 2024

Related U.S. Application Data

(63) Continuation of application No. 16/952,036, filed on Nov. 18, 2020, now Pat. No. 12,004,534, which is a
(Continued)

(51) Int. Cl.
*A23G 9/08* (2006.01)
*A23G 9/22* (2006.01)
(Continued)

(52) U.S. Cl.
CPC ........... *A23G 9/287* (2013.01); *A23G 9/08* (2013.01); *A23G 9/22* (2013.01); *A23G 9/225* (2013.01);
(Continued)

(58) Field of Classification Search
CPC .......... A23G 9/287; A23G 9/283; A23G 9/08; A23G 9/22; A23G 9/225; A23G 9/28; A23G 9/24; A23G 9/282
See application file for complete search history.

(56) References Cited

U.S. PATENT DOCUMENTS

| 5,281,429 A | 1/1994 | Zevlakis |
| 5,400,614 A | 3/1995 | Feola |

(Continued)

FOREIGN PATENT DOCUMENTS

| CN | 101754704 A | 6/2010 |
| CN | 203552353 U | 4/2014 |

(Continued)

OTHER PUBLICATIONS

Co-pending claims of U.S. Appl. No. 16/952,036, filed Nov. 18, 2020.
(Continued)

*Primary Examiner* — Frederick C Nicolas
(74) *Attorney, Agent, or Firm* — Renner, Otto, Boisselle & Sklar, LLP

(57) ABSTRACT

A machine for dispensing an individual portion of a frozen dessert may include a cartridge cart having walls forming a cavity having a longitudinal central axis and configured to accommodate a cartridge. The cartridge may include a tube having first and second ends, a nozzle disposed at the first end, and a piston disposed between the nozzle and the second end and configured to slidably move along the tube. The individual portion of the frozen dessert may be con-
(Continued)

tained within the tube between the nozzle and the piston. The machine may also include a plunger, a drive source operably coupled to the plunger and configured to drive the plunger along the central axis, and a support configured to support the first end of the cartridge such that actuating the drive source causes the individual portion of frozen dessert to dispense through the nozzle.

15 Claims, 28 Drawing Sheets

Related U.S. Application Data continuation-in-part of application No. PCT/US2019/033158, filed on May 20, 2019.

(60) Provisional application No. 62/757,349, filed on Nov. 8, 2018, provisional application No. 62/673,173, filed on May 18, 2018.

(51) Int. Cl.
  *A23G 9/24* (2006.01)
  *A23G 9/28* (2006.01)
(52) U.S. Cl.
  CPC ............... *A23G 9/24* (2013.01); *A23G 9/28* (2013.01); *A23G 9/282* (2013.01); *A23G 9/283* (2013.01)

(56) References Cited

U.S. PATENT DOCUMENTS

| | | | |
|---|---|---|---|
| 5,421,484 | A | 6/1995 | Beach |
| 5,463,878 | A | 11/1995 | Parekh et al. |
| 5,492,249 | A | 2/1996 | Beach |
| 6,155,461 | A | 12/2000 | Ishihara et al. |
| 6,182,862 | B1 | 2/2001 | McGill |
| 6,332,636 | B1 | 12/2001 | Cohen et al. |
| 7,017,783 | B1 | 3/2006 | Hunter et al. |
| 7,165,699 | B2 | 1/2007 | McGill |
| 7,448,516 | B2 | 11/2008 | Davis et al. |
| 7,861,890 | B2 | 1/2011 | McGill |
| 8,377,043 | B2 | 2/2013 | Kriesel et al. |
| 9,394,960 | B2 | 7/2016 | Weber |
| 9,775,368 | B2 | 10/2017 | McGill et al. |
| 9,821,950 | B2 | 11/2017 | Talon |
| 9,930,903 | B2 | 4/2018 | Feola |
| 9,949,590 | B2 | 4/2018 | Bartoli et al. |
| 10,299,494 | B2 | 5/2019 | Feola |
| 10,301,159 | B2 | 5/2019 | Feola |
| 10,492,513 | B1 | 12/2019 | Sullivan |
| 11,622,568 | B2 | 4/2023 | Kaliszewski et al. |
| 12,004,534 | B2 * | 6/2024 | Spirk ............ A23G 9/283 |
| 2003/0075556 | A1 | 4/2003 | Tajima et al. |
| 2006/0255066 | A1 | 11/2006 | Kannar et al. |
| 2008/0187633 | A1 | 8/2008 | Cox |
| 2010/0163573 | A1 | 7/2010 | Wegelin et al. |
| 2016/0198735 | A1 | 7/2016 | Beth Halachmi |
| 2017/0360061 | A1 | 12/2017 | Fonte |
| 2018/0022593 | A1 | 1/2018 | Feola |
| 2019/0070643 | A1 | 3/2019 | Wong et al. |
| 2019/0125122 | A1 | 5/2019 | Feola |

FOREIGN PATENT DOCUMENTS

| | | |
|---|---|---|
| DE | 29712273 U1 | 11/1998 |
| EP | 0995685 A1 | 4/2000 |
| EP | 1199279 A2 | 4/2002 |
| EP | 1211950 B1 | 12/2003 |
| EP | 2508080 A1 | 10/2012 |
| EP | 2578119 A1 | 4/2013 |
| EP | 3192616 A1 | 7/2017 |
| EP | 3525146 A1 | 8/2019 |
| GB | 942642 A | 11/1963 |
| GB | 2414225 A | 11/2005 |
| JP | 2000-139358 A | 5/2000 |
| JP | 4948419 B2 | 6/2012 |
| JP | 5721273 B2 | 5/2015 |
| KR | 101240407 B1 | 3/2013 |
| KR | 20190091078 A | 8/2019 |
| RU | 2463245 C2 | 10/2012 |
| WO | 0022936 A1 | 4/2000 |
| WO | 0119202 A1 | 3/2001 |
| WO | 01/78520 A1 | 10/2001 |
| WO | 2005/113387 A2 | 12/2005 |
| WO | 2015/031515 A1 | 3/2015 |
| WO | 2017139361 A1 | 8/2017 |
| WO | 2019222752 A1 | 11/2019 |
| WO | 2021110787 A1 | 6/2021 |

OTHER PUBLICATIONS

International Search Report and Written Opinion (ISRWO) corresponding to counterpart International Patent Application PCT/US2019/033158 mailed Aug. 16, 2019.
Chinese Office Action corresponding to counterpart Chinese patent application No. 201980047330.7 dated Feb. 4, 2023, with English translation.
International Search Report and Written Opinion mailed Feb. 11, 2022 in corresponding International Application No. PCT/US2021/055560.
United States Office Action corresponding to parent U.S. Appl. No. 16/952,036 dated Sep. 12, 2023.
Chinese Office Action corresponding to counterpart Chinese patent application No. 202180090997.2 dated Feb. 21, 2025, with English translation.
Canadian Examination Report corresponding to counterpart Canadian patent application No. 3,214,807 dated Apr. 11, 2025.

* cited by examiner

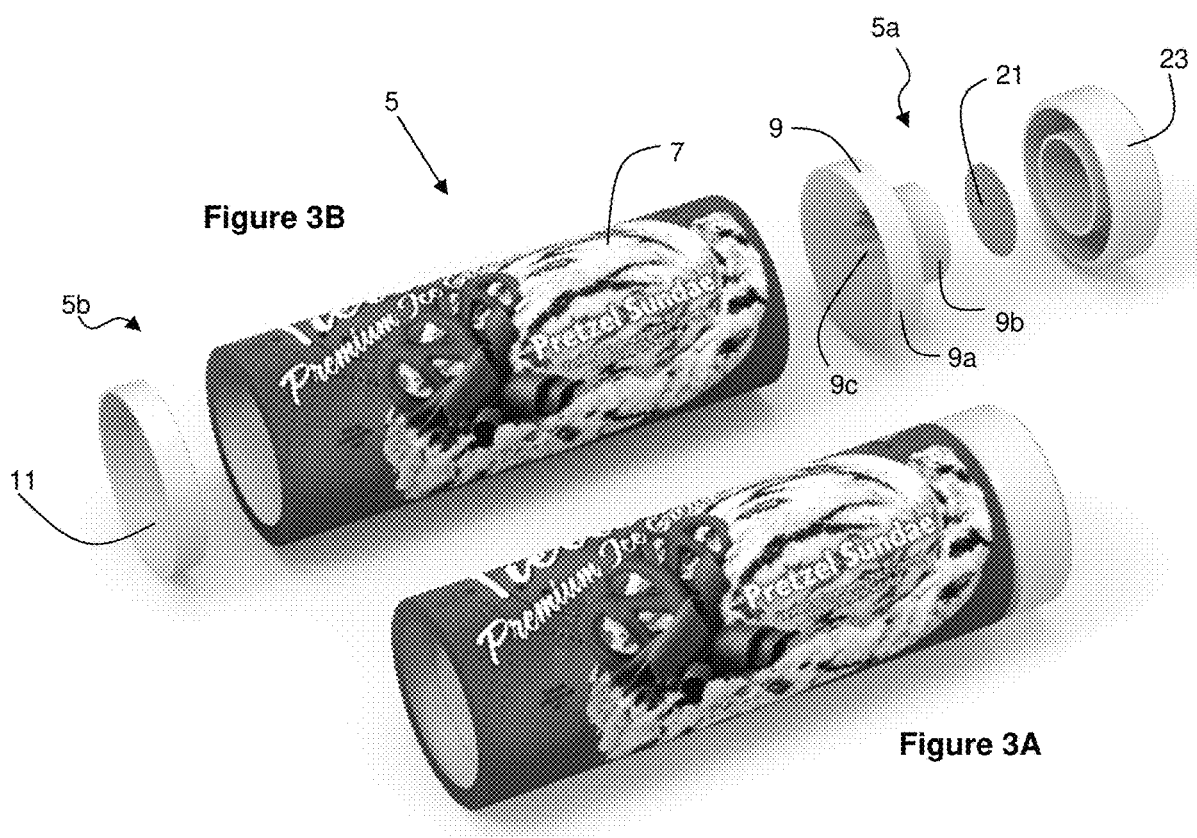

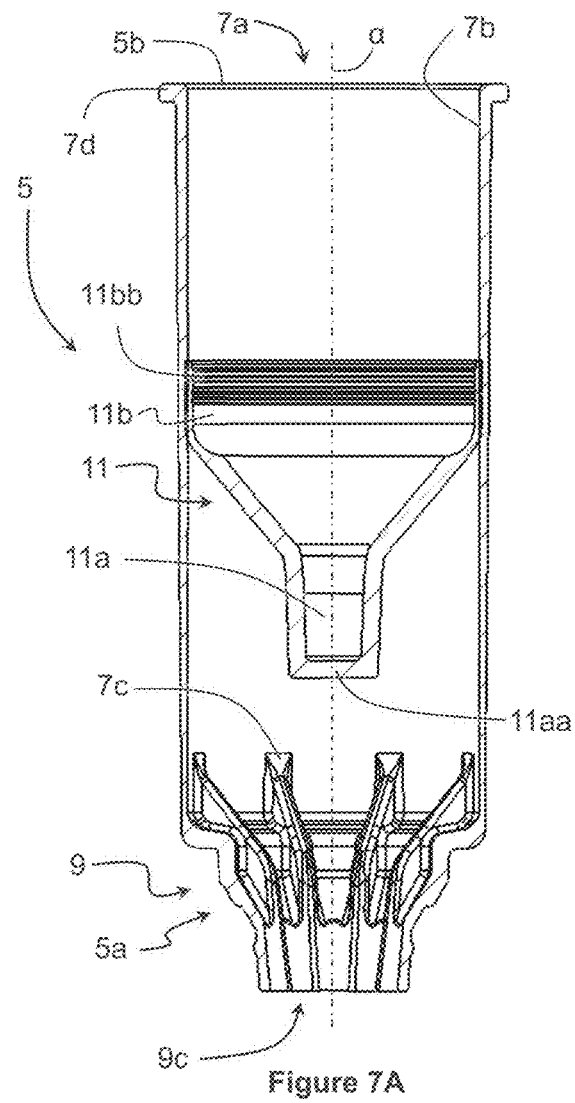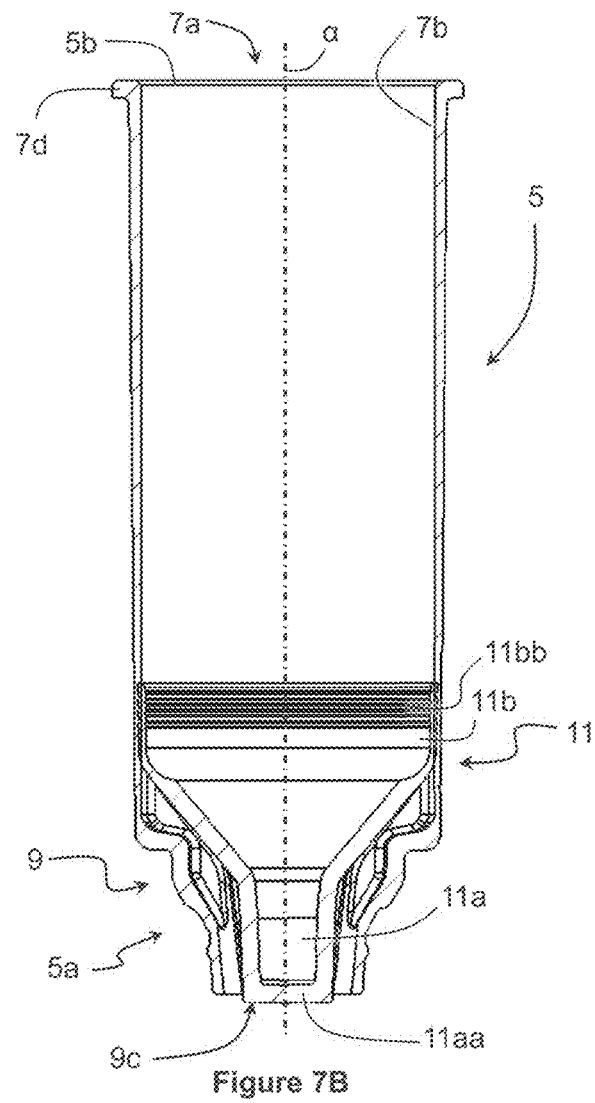
Figure 7A
Figure 7B
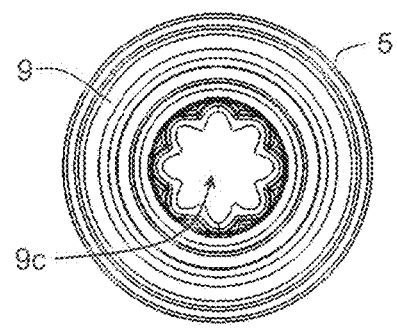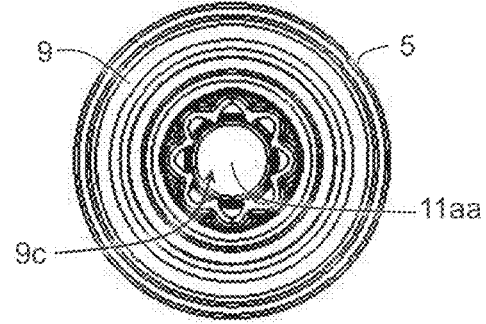
Figure 7C
Figure 7D

FROZEN DESSERT DISPENSING MACHINE AND CARTRIDGE

This application is a Continuation and claims priority of United States of America application Ser. No. 16/952,036 filed Nov. 18, 2020, which claims priority of International Application PCT/US2019/033158 filed May 20, 2019, which claims priority of U.S. Application No. 62/757,349 filed Nov. 8, 2018 and U.S. Application No. 62/671,173 filed May 18, 2018, each of which is incorporated herein by reference in its entirety.

BACKGROUND

Consumers enjoy quality gourmet ice cream at home and other locations but particularly at ice cream parlors. A challenge for ice cream parlors, however, is that dispensing gourmet ice cream involves significant overhead. For example, an associate must scoop the ice cream from a large bin into a cup or cone for the consumer to enjoy. The associate must also add any inclusions (e.g., nuts, sprinkles, etc.) that are not already part of the ice cream. To make matters worse, the associate may underfill or overfill the ice cream scoops resulting in consumption levels that are difficult for the parlor to track and, therefore, predict. In addition, consumers may not desire to travel to ice cream parlors to enjoy gourmet ice cream.

Retailers have tried to meet these challenges by pre-packaging gourmet ice cream in containers that consumers can purchase. A drawback of this approach is that, at the retailer, these containers must be stored in large freezers that either occupy too much prime real estate, which is undesirable, or must be kept out of sight from the consumer, which is also undesirable. And, even after the consumer finds the ice cream, it may not be ready for consumption because it is typically kept at too cold a temperature (e.g., 0° F. to −20° F.), which makes the ice cream too hard and a struggle for consumers to enjoy.

To make up for some of these drawbacks, retailers have deployed large soft serve "ice cream" machines. These machines typically must run all day and may require stabilizing ingredients be included in the ice cream mix. When the mix is ready for consumption, a consumer or store associate pulls on a handle to dispense the soft serve ice cream into a cup or cone. But soft serve ice cream typically contains no inclusions (e.g., no chocolate chunks) as they would clog the machine's nozzle. Flavor selection is also limited. The machines are bulky. If a new, different flavor is desired the machine must be purged, cleaned, and then refilled with the new flavor and then allowed to cool to the proper serving temperature. Conventional soft serve machines may also require expensive maintenance and cleaning, and may require to be running around the clock to keep the ingredients mixed, frozen, and ready to serve.

SUMMARY OF THE INVENTION

The present disclosure provides an ice cream dispensing machine that extrudes premium ice cream from a cartridge and dispenses it into a cup. The machine accepts a proprietary cartridge filled with (but not limited to) ice cream and dispenses the ice cream into a cup at the press of a button. The machine may then eject the empty cartridge, obviating the need for the user to remove the used cartridge. Interestingly, the process of extruding the frozen ice cream from the cartridge, causes the surface of the ice cream to become instantly edible. This addresses the prior art problem in which frozen ice cream was too hard to eat directly from the freezer and consumers had to wait for the ice cream to warm up or struggle with eating rock-hard ice cream. Moreover, the machine and cartridge disclosed herein allow for inclusions in the ice cream. The machine, cartridge, and process disclosed herein allows for the autonomous serving of frozen dessert in a manner that is attractive, clean, and low maintenance, dealing with issues such as preventing leakage and spillage and discarding of empty cartridges. The invention(s) disclosed here may provide these and other advantages over the prior art.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIGS. 3A and 3B illustrate perspective and exploded views of an exemplary cartridge for dispensing an individual portion of a frozen dessert.

FIGS. 7A and 7B illustrate cross-sectional views of an exemplary cartridge.

FIGS. 7C and 7D illustrate front views of an exemplary nozzle of the exemplary cartridge of FIGS. 7A and 7B.

DETAILED DESCRIPTION

Figure 1:
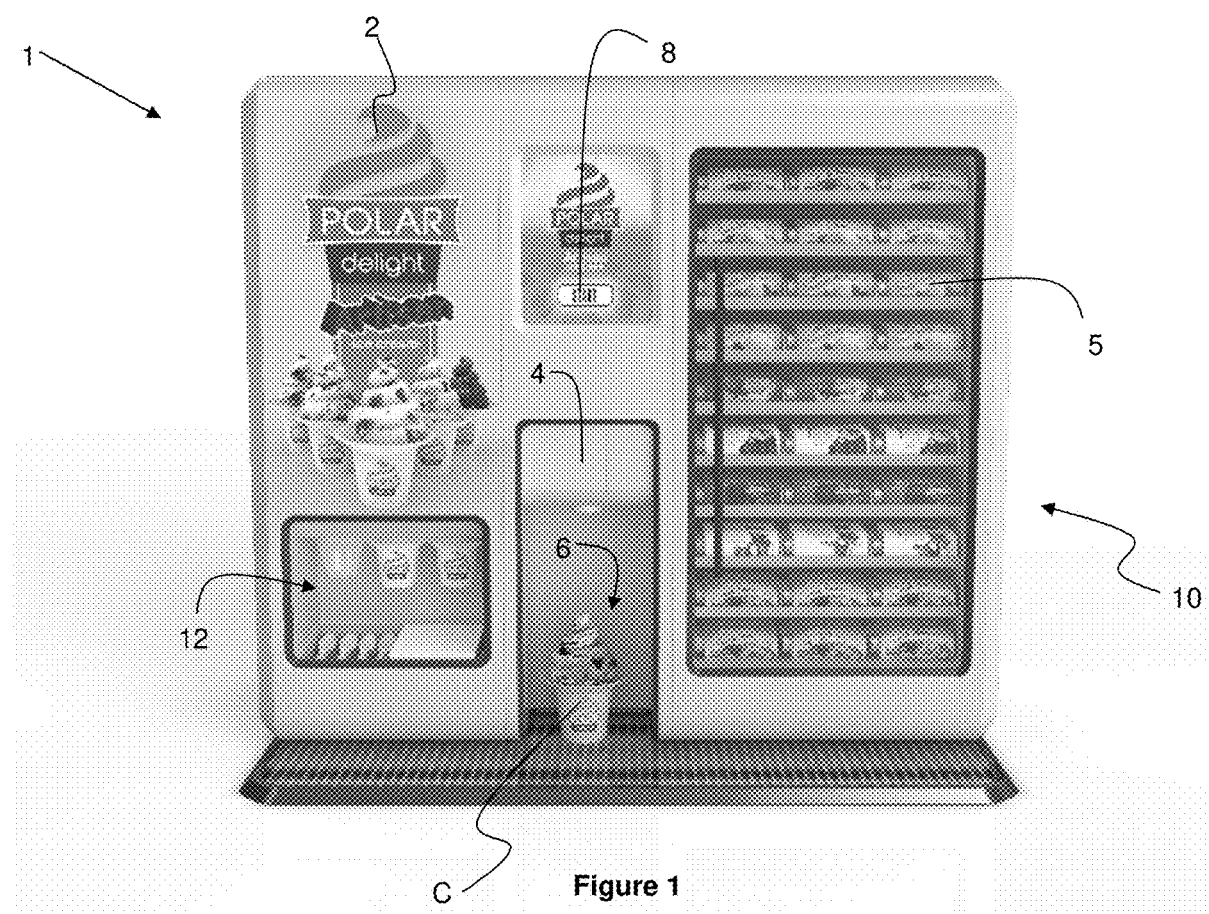
FIG. 1 illustrates a front view of an exemplary machine for dispensing an individual portion of a frozen dessert.

FIG. 1 illustrates an exemplary machine 1 for dispensing an individual portion of a frozen dessert. The machine 1 may include an enclosure 2 having a front door 4 or opening for inserting a cartridge 5 into the machine 1. The cartridge 5 may be filled with any type of frozen dessert such as ice cream, frozen yogurt, frozen milkshake mix, etc. The front door 4 or opening connects to a passage that leads the cartridge 5 into a cartridge cart 3 as described below. The machine 1 may accommodate cartridges 5 of various sizes (e.g., length) depending on a serving size. For a small serving the machine 1 may accommodate a shorter cartridge 5 while for a larger serving the machine 1 may accommodate a longer cartridge 5.

The machine 1 may also include a serving area 6 where a user may put a cup to which the frozen dessert may be dispensed. The machine 1 may also include controls 8 such as a touchscreen or physical buttons that allow the user to start the dispensing process. The machine 1 may include, for example, an electronic display that displays instructions to a user as to how to operate the machine. The machine 1 may also include a proximity sensor that detects proximity of a user to the machine 1 and, based on the detected proximity, commence displaying the instructions.

The machine 1 may include or be disposed next to a freezer 10 to keep cartridges 5 filled with frozen dessert at the ideal temperature (e.g., −5° F. to 0° F.). In one embodiment, the freezer 10 may be operably connected to the machine 1 and may auto load cartridges 5 from the freezer 10 into the machine 1.

The machine 1 may also include a supplies area 12 where cups, spoons, napkins, etc. may be kept as a convenience to users. A user may take a cup C from the supplies area 12, set it in the serving area 6, select a cartridge 5 from the freezer 10, insert the cartridge 5 through the passage behind the door 4, and press Start on the controls 8 to start the dispensing process.

Figure 2A:
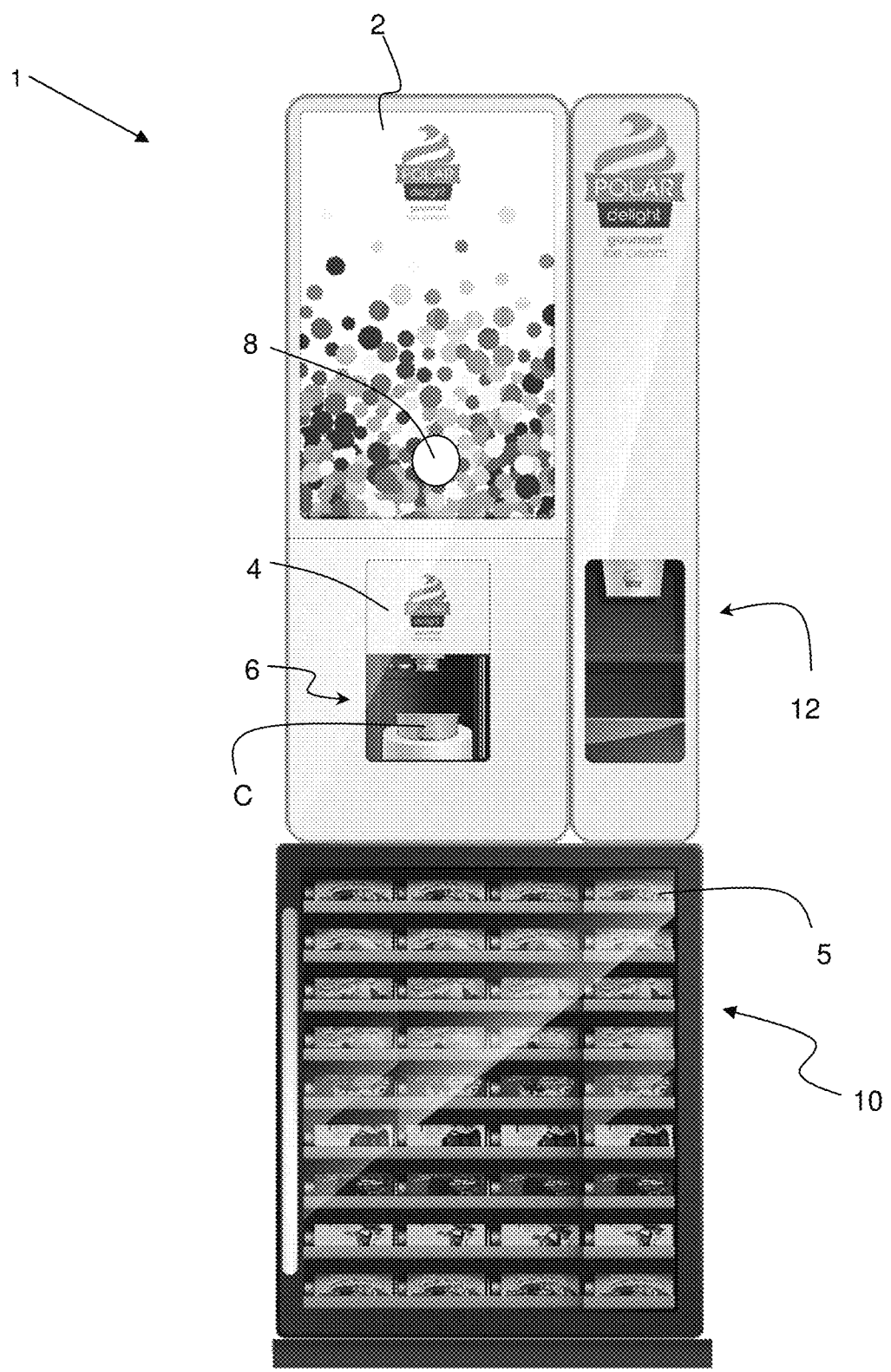
FIGS. 2A and 2B illustrate another exemplary machine for dispensing an individual portion of a frozen dessert.
Figure 2B:
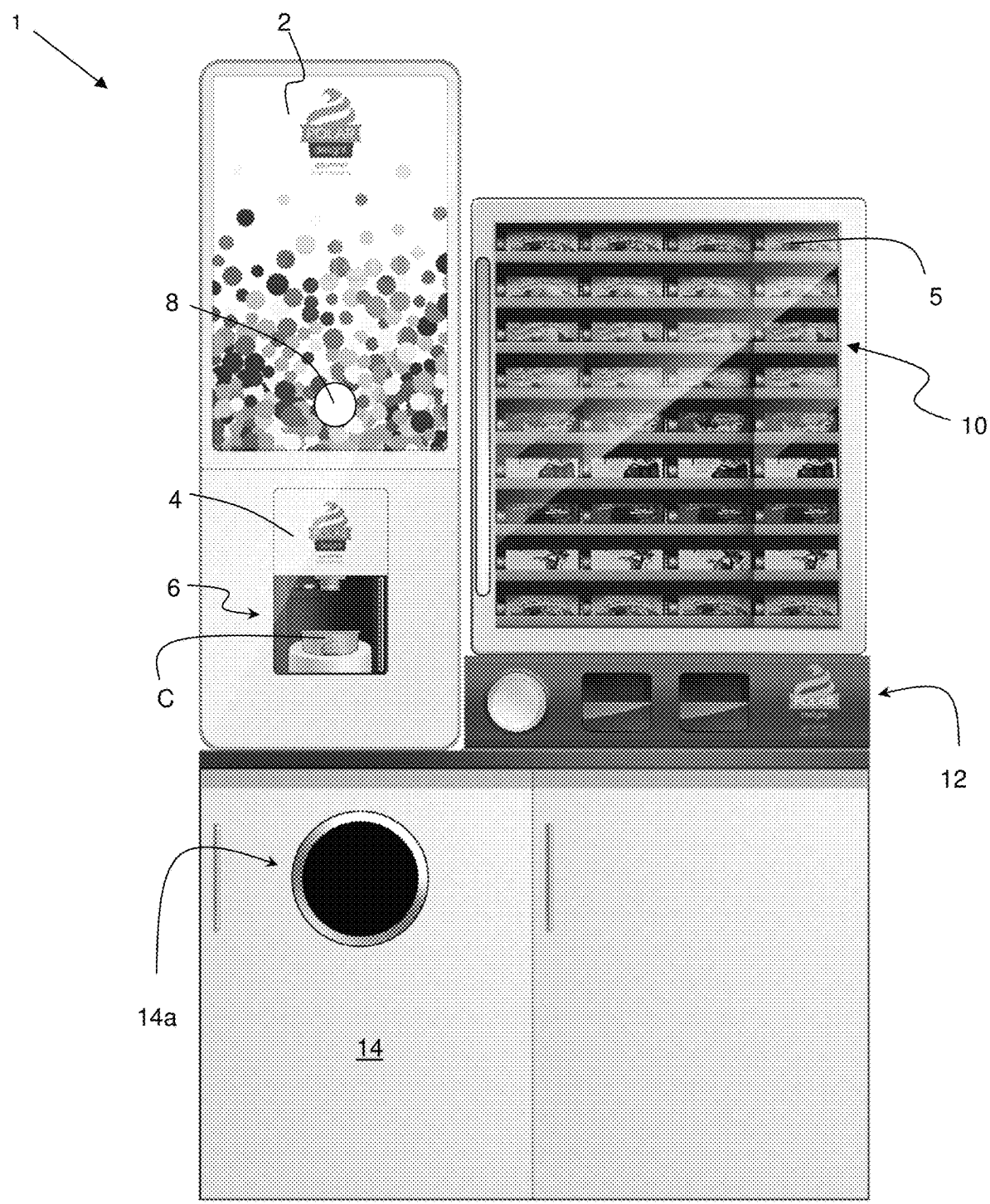

FIGS. 2A and 2B illustrate another exemplary machine 1 for dispensing an individual portion of a frozen dessert. Like the machine 1 of FIG. 1, the machine 1 of FIGS. 2A and 2B may include an enclosure 2 having a front door 4 or opening for inserting a cartridge 5 into the machine 1. The cartridge 5 may be filled with any type of frozen dessert such as ice cream, frozen yogurt, frozen milkshake mix, etc. The front door 4 or opening connects to a passage that leads the cartridge 5 into a cartridge cart 3 as described below. The front door 4 may accommodate cartridges 5 of various sizes (e.g., length) depending on a serving size.

The machine 1 may also include a serving area 6 where a user may put the cup C to which the frozen dessert may be dispensed. The machine 1 may also include controls 8 such as a touchscreen or physical buttons that allow the user to start the dispensing process.

As shown in FIG. 2A, the machine 1 may include or may be located above a freezer 10 to keep cartridges 5 filled with frozen dessert at the ideal temperature (e.g., −5° F. to 0° F.). In the illustrated embodiment of FIG. 2A, the freezer 10 serves as a stand for the machine 1. As shown in FIG. 2B, the freezer 10 may be located next to the machine 1. In the illustrated embodiment of FIG. 2B, the machine 1 and the freezer 10 are placed on a stand or counter 14. The stand 14 may have an opening 14a for receiving trash and may have another opening on top (not shown) to dispose of used cartridges 5 into a discard bin. In the embodiment of FIG. 2A, the machine 1 may have stored within (see FIG. 17) a discard bin 54. The machine 1 may also include or may be disposed next to a supplies area 12 where cups, cones, spoons, napkins, etc. may be kept as a convenience to users.

In yet another possible configuration (not shown), the machine 1 and the supplies area 12 may be placed adjacent to each other on the counter 14 and the freezer 10 may be placed on the floor below the counter 14. Many other configurations are possible while remaining within the meaning and intent of the present invention.

A user may take a cup C from the supplies area 12, set it in the serving area 6, select a cartridge 5 from the freezer 10, insert the cartridge through the passage behind door 4, and press Start on the controls 8 to start the dispensing process.

FIGS. 3A and 3B illustrate perspective and exploded views, respectively, of an exemplary cartridge 5 for dispensing an individual portion of a frozen dessert. The cartridge 5 includes a cylindrical tube 7 and has a first end 5a, a second end 5b, and a central axis α. A nozzle 9 is disposed at the first end 5a and a cap 23 may cover the nozzle 9 prior to dispensing of the frozen dessert. The nozzle 9 may be adhered to the tube 7 or it may be integral with the tube 7. The nozzle 9 has a shoulder 9a that meets the tube 7 at the first end 5a and a neck 9b that has a diameter smaller than a diameter of the cylindrical tube 7 and the shoulder 9a. A piston 11 is disposed between the nozzle 9 and the second end 5b. The piston 11 is configured to slide along the cylindrical tube 7 to expel an individual portion of the frozen dessert contained in the cartridge 5 through the nozzle 9. Although the cartridge 5 and tube 7 are described as cylindrical herein, no such limitation is necessary and the cartridge 5 and tube 7 may have shapes/cross-sections other than cylindrical (e.g., square, rectangular, triangular, etc.)

The nozzle 9 has an opening 9c from which the frozen dessert dispenses. The opening 9c may be, for example, star-shaped to shape the frozen dessert when dispensed. In one embodiment, the piston 11 and the interior of the nozzle 9 have corresponding shapes so that, when press against each other, space between them is minimized to maximize an amount of the frozen dessert dispensed from the cartridge 5. During the dispensing or extrusion process through the shaping nozzle 9, due to friction of extruding, the frozen dessert exposed to the nozzle 9 may warm up to an ideal serving temperature or at least soften to make it more enjoyable. The opening 9c may be formed by nozzle portions whose edges cause friction with the frozen dessert being dispensed causing the temperature and/or texture of the frozen dessert exposed to the edges to change. This helps soften the surface of the frozen dessert making it more easily enjoyable immediately after serving. In one example, extrusion through the nozzle and contact with the nozzle portions may cause the temperature of the frozen dessert exposed to the edges to rise from a freezer temperature of between −5° F. and 0° F. to an ideal serving temperature of between 6° F. and 10° F.

The nozzle 9 may have installed thereon a foil seal 21 that covers the nozzle 9 prior to dispensing of the frozen dessert. In another embodiment, the seal 21 may instead be installed over the cap 23. The foil seal 21 and/or the cap 23 may help protect the nozzle 9 during transportation of the cartridge 5. A user may break off the seal 21 and/or cap 23 prior to inserting the cartridge 5 into the machine 1 or the machine 1 may include a device that exerts force upon the seal 21 and/or cap 23 thereby causing the seal 21 and/or cap 23 to break off the cartridge 5. The cap 23 may include, for example, a circular groove (not shown) inside which a device may be inserted to apply axial force to the cap 23 to remove it from the rest of the cartridge 5. The seal 21 may include a tail connected (e.g., adhesive, thermal weld, etc.) to the neck of the nozzle 9 to keep the seal 21 connected to the cartridge 5 after the seal 21 has been broken.

The cartridge 5 may include an identification (e.g., bar code, q-code, RFID, etc.) and the machine 1 may include a reader for reading the identification. The machine 1 may read the ID to identify production batch, expiration date, size, flavor, lot number, manufacturer, etc. and/or to ensure the cartridge 5 is genuine. This information may be shown to the consumer on a display of machine 1 or may be recorded or transmitted (e.g., via Wi-Fi) to monitor use, consumption, etc.

Figure 4:
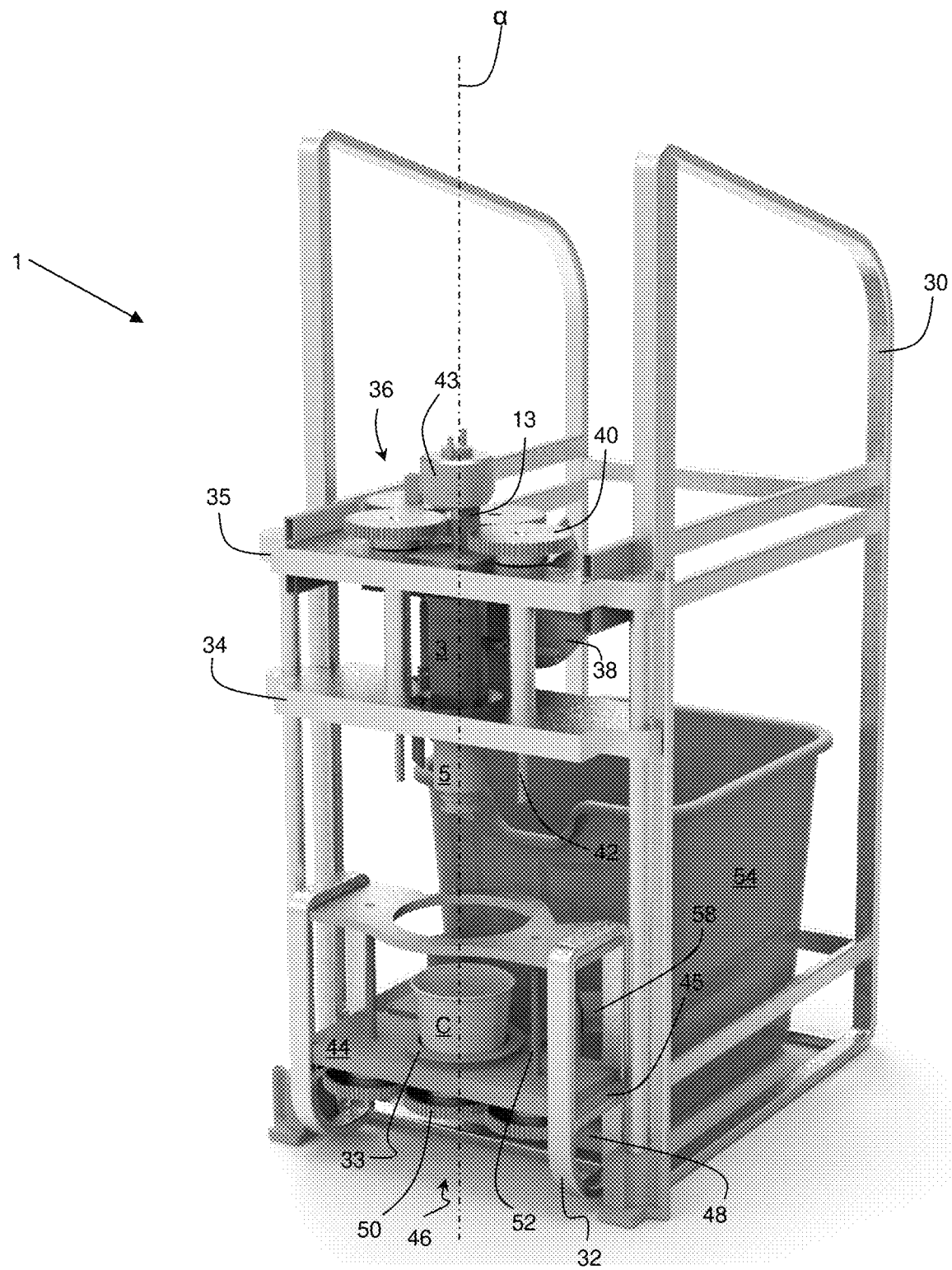
FIG. 4 illustrates a perspective view of the machine of FIGS. 2A and 2B with the enclosure removed.

FIG. 4 illustrates a perspective view of the machine 1 with the enclosure 2 removed. Significant components of the machine 1 include the cartridge cart 3 into which the frozen dessert cartridge 5 is inserted and a plunger 13 relative to which the cartridge cart 3 moves along the central axis α to expel the frozen dessert from the cartridge 5. Other significant components include the turntable 33 on which the cup C rests for receiving the frozen dessert expelled from the cartridge 5, and a discard bin 54 into which empty cartridges may be disposed after use.

The machine 1 may include a main frame 30 and a hinged frame 32 hingedly connected to the main frame 30.

The main frame 30 may have built thereon a first vertically moving structure 34 and a first fixed structure 35. The first vertically moving structure 34 carries the cartridge cart 3. The first vertically moving structure 34 may also include a servo (not shown) to tilt the cartridge cart 3 during loading of the cartridge 5, as described below. The fixed structure 35 carries the plunger 13 and the first drive source 36. The fixed structure 35 may also include a servo 43 to actuate radial grippers at the top of the plunger 13 for retaining the cartridge 5 attached to the plunger 13 once frozen dessert has been expelled from the cartridge 5. The fixed structure 35 may also include a servo (not shown) to tilt the plunger 13 retaining the empty cartridge 5 for discarding the cartridge 5 into the bin 54. The first drive source 36 may include a motor 38, gears 40, and lead screws 42. Actuating the first drive source 36 causes the first vertically moving structure 34 to move vertically relative to the fixed structure 35. Therefore, actuating the first drive source 36 causes the cartridge cart 3 to move vertically relative to the plunger 13.

The hinged frame 32 may have built thereon a second vertically moving structure 44 and a second fixed structure 45. The second vertically moving structure 44 carries the turntable 33 on which the cup C rests for receiving the frozen dessert expelled from the cartridge 5. The second vertically moving structure 44 may also include a motor 58 for turning the turntable 33. The second fixed structure 45 carries the second drive source 46. The drive source 46 may include a motor 48, gears 50, and lead screws 52. Actuating the second drive source 46 causes the second vertically moving structure 44 to move vertically relative to the second fixed structure 45. Therefore, actuating the second drive source 46 causes the cup C to move vertically relative to the plunger 13 while turning the turntable 33.

Figure 5:
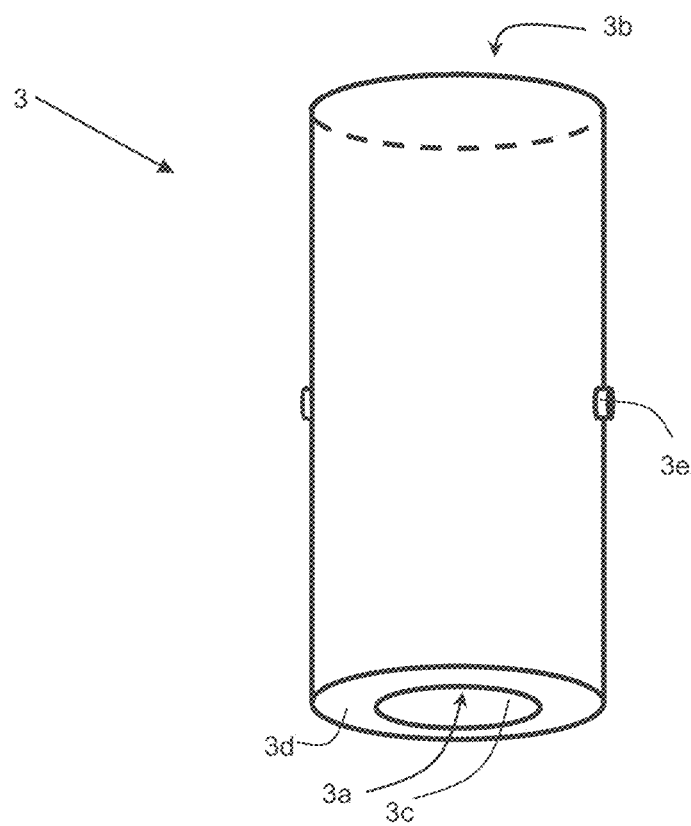
FIG. 5 illustrates a perspective view of an exemplary cartridge cart.

FIG. 5 illustrates a perspective view of an exemplary cartridge cart 3. The cartridge cart 3 has a wall or walls forming a cylindrical cavity 3a which may accommodate the cartridge 5. The cavity 3a has a large top opening 3b and a smaller bottom opening 3c. The cartridge cart 3 also includes a support wall 3d surrounding the bottom opening 3c. The cartridge cart 3 may also include tabs 3e that connect to a tilting mechanism of the machine 1 to tilt the cartridge cart 3 so that the top opening 3b may present itself at the front of the machine 1 for a user to insert a cartridge 5 into the cartridge cart 3. Once inserted, the nozzle neck 9b of the cartridge 5 would protrude through the bottom opening 3c and the nozzle shoulder 9a would rest on the inside of the support wall 3d. The cartridge cart 3 may accommodate cartridges of various sizes (e.g., length) depending on a serving size. For a small serving the cart 3 may accommodate a shorter cartridge 5 while for a larger serving the cart 3 may accommodate a longer cartridge 5. Although the cartridge 5 and cartridge cart 3 are described herein as cylindrical, no such limitation is necessary and the cartridge 5 and cartridge cart 3 may have shapes/cross-sections other than cylindrical (e.g., square, rectangular, triangular, etc.)

Figure 6:
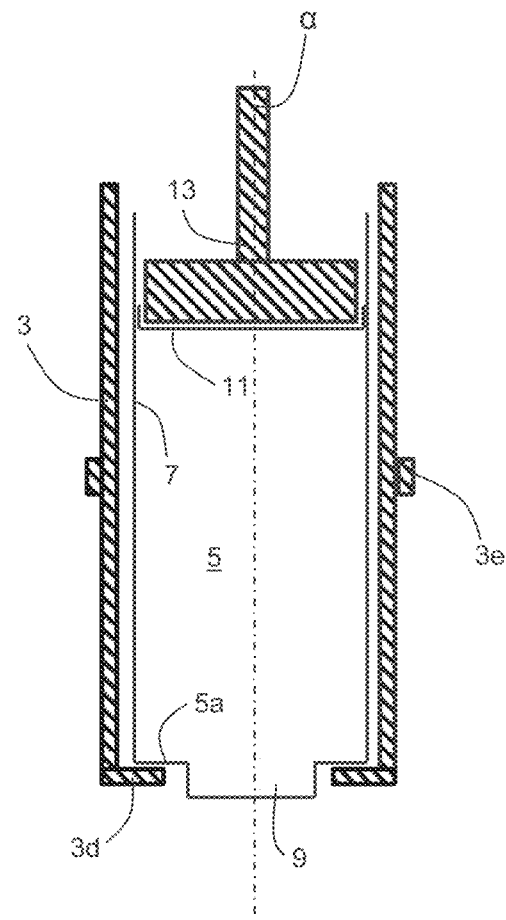
FIG. 6 illustrates a schematic view of the interaction between a cartridge cart, a cartridge, and a plunger.

FIG. 6 illustrates a schematic view of the interaction between the cartridge cart 3, the cartridge 5, and the plunger 13. The cartridge cart 3 includes the support wall 3d that supports the first end 5a or, more specifically, the nozzle shoulder 9a of the cartridge 5 with the plunger 13 in engagement with the piston 11. The support wall 3d axially supports (against gravity and against force applied by the plunger 13) the cartridge 5.

The cartridge cart 3 also radially supports the cartridge 5. The cartridge cart 3 resists radial force exerted on the cylindrical tube 7 by the frozen dessert as the plunger 13 pushes the piston 11 along the central axis α. Therefore, actuating the first drive source 36 causes the frozen dessert to dispense through the nozzle 9 without the cartridge 5 (even if made of a relatively soft material such as paper, cardboard, or light plastic) rupturing or exploding from the applied pressure. The cartridge cart 3 may be fabricated from a material whose tensile strength withstands the load applied to its walls (when the drive source 36 causes the individual portion of frozen dessert to dispense) without failure or plastic deformation of the cartridge cart 3. In one embodiment, the cartridge cart 3 is manufactured from steel. In other embodiments, the cartridge cart 3 is manufactured from materials other than steel.

FIGS. 7A-7F illustrate various views of an embodiment of the cartridge 5 including the piston 11. At the manufacturing location, the frozen dessert (e.g., ice cream) is filled into the cartridge 5 through the large diameter opening 7a at the second end 5b of the cartridge 5 and, thereafter, the piston 11 may be inserted nose 11a first into the large diameter opening 7a. A cap 23 (see FIG. 7E) installed to cover the nozzle opening 9c keeps the frozen dessert inside the cartridge 5. In the illustrated embodiment, the piston 11 is funnel shaped. The piston 11 serves numerous functions including: (1) Reducing the internal volume of the cartridge 5 for the purpose of displacement of the frozen dessert. It accomplishes this by being pushed by an external element (i.e., the plunger 13); (2) Maintaining a seal with the cartridge tube's bore 7b sufficiently to resist the frozen dessert to leak through the interface between the piston 11 and the bore 7b; and (3) The nose 11a penetrates through nozzle 9 such that the nose end 11aa, having a shape matching that of the nozzle opening 9c, may reduce flow volume of the individual portion of the frozen dessert from the nozzle 9, increasing the ability of the individual portion of frozen dessert to severe neatly from the cartridge 5.

FIGS. 7A and 7B are lengthwise cross-sectional views of the cartridge 5. As shown in FIGS. 7A and 7B, as the plunger 13 pushes the piston 11 along the central axis α, the piston 11 advances towards the nozzle 9. FIG. 7A illustrates the plunger 11 about half way through the cylindrical tube 7 while FIG. 7B illustrates the plunger 11 at its final position, after the individual portion of the frozen dessert has been dispensed.

It is essential for a frozen dessert dispensing machine 1 using pods or cartridges 5 to provide means for protecting and containing the frozen dessert within the cartridge 5. Seals or closures must be provided to reduce the potential for contamination of the frozen dessert and prevent soiling of storage containers, delivery vehicles, freezers, dispensing machines, waste bins, etc. The seal formed at the interface of the piston 11 and tube bore 7b also needs to resist the high pressures generated during dispensing. To this end, the piston 11 includes a circumferential seal 11b made of an elastomeric material and that engages the bore 7b of the cylindrical tube 7 and has an outer diameter larger than an inner diameter of the bore 7b. When either the tube 7, piston 11 or both are fabricated of a compliant material (e.g., elastomeric), engagement of the parts will generally force the tube 7 to a larger diameter, force the piston 11 to a smaller diameter, or some combination of the two.

The circumferential seal 11b may have formed thereon multiple radially indented grooves 11bb forming radially extending ribs, each rib contributes to the overall sealing ability between the piston 11 and the bore 7b. The grooves reduce the surface area of contact between the piston 11 side walls and the bore 7b of the tube 7. The result will be the formation of hoop stresses leading to increased contact pressure, and hence, increased ability of the interface to form a seal.

The tube 7 may also have a flange or lip 7d formed thereon at the second end 5b to be gripped by claws as described below during discarding of the cartridge 5.

FIGS. 7C and 7D illustrate bottom views of the cartridge 5. As can be seen from the figures, the nozzle opening 9c may be star shaped. In FIG. 7C (which corresponds to FIG. 7A) the nose end 11aa of the plunger 11 is not yet visible because the plunger 11 is only about half way through the cylindrical tube 7. In FIG. 7D (which corresponds to FIG. 7B) the plunger 11 is at its final position, after the individual portion of the frozen dessert has been dispensed and, thus, the nose end 11aa of the plunger 11 can be seen penetrating and maybe even protruding slightly from the nozzle opening 9c.

The shape of the extended nose 11aa of the piston 11 may be of a size and shape sufficient to pass through, penetrate, and maybe even protrude slightly from the nozzle opening 9c to assist in the severing of the frozen dessert stream from the nozzle 9. Thus, upon removal of the cap 23, the nozzle opening 9c may be at first fully open as the piston 11 travels from the second end 5b towards the first end 5a until the piston 11 reaches the nozzle 9. Then the nose 11a penetrates through nozzle 9 such that the nose end 11aa reduces flow volume of the individual portion of the frozen dessert from the nozzle opening 9c increasing the ability of the individual portion of the frozen dessert to severe cleanly from the cartridge 5.

Figures 7E, 7F:
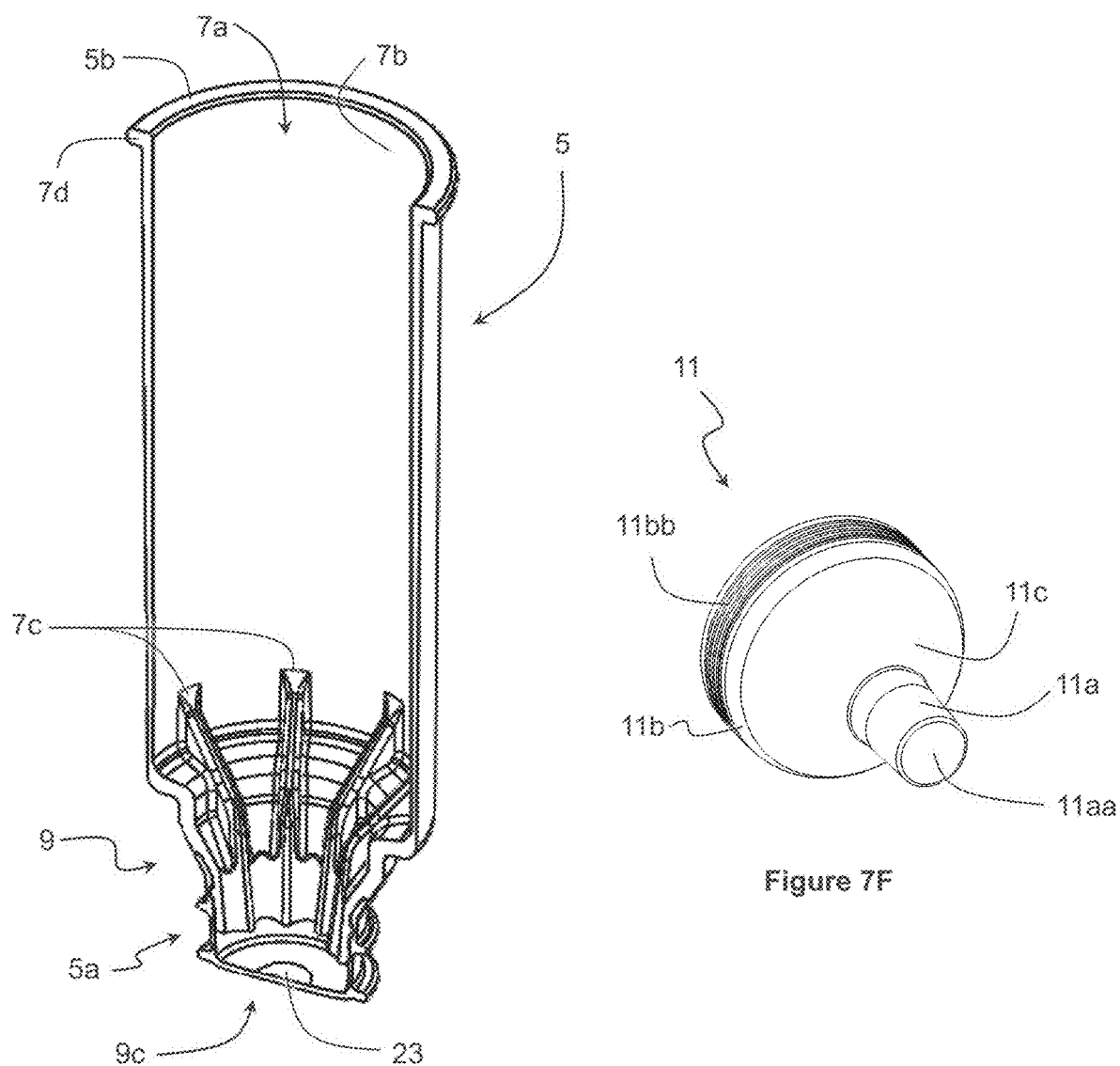
FIG. 7E illustrates a top perspective cross-sectional view of the exemplary cartridge of FIGS. 7A and 7B.
FIG. 7F illustrates a bottom perspective view of a piston of the cartridge of FIGS. 7A and 7B.

Thus, as best seen in FIG. 7F, the piston 11 may include a cylindrical or frustoconical nose 11a having a nose end 11aa, a sealing area 11b, and a frustoconical surface 11c joining the nose 11a to the seal 11b.

FIG. 7E illustrates a perspective cross-sectional view of the cartridge 5. The cartridge 5 may include ribs 7c designed to split the flow of frozen dessert into channels as it advances towards the star-shaped nozzle opening 9c. The build-up of frozen dessert pressure is lessened to some degree when such ribs 7c are aligned with the star shape of the nozzle opening 9c and can direct the resulting ice cream channels to each of the lobes of the star pattern of the nozzle opening 9c.

Thus, the nozzle 9 may include a star-shaped nozzle opening 9c from which at least most of the individual portion of the frozen dessert is to exit the cartridge 5. Internal ribs 7c may align with the star-shaped nozzle opening 9c. Each of the ribs 7c may taper as it extends radially inwards from the bore 7b of the cylindrical tube 7 towards the axial center α of the cylindrical tube 7. Each of the ribs 7c may decline away from the second end 5b towards the first end 5a (i.e., towards the nozzle opening 9c) as it extends radially inwards from the bore 7b of the cylindrical tube 7 towards the axial center α of the cylindrical tube 7. The individual portion of the frozen dessert may ultimately resemble the nozzle opening's star shape as it exits.

Figure 8:
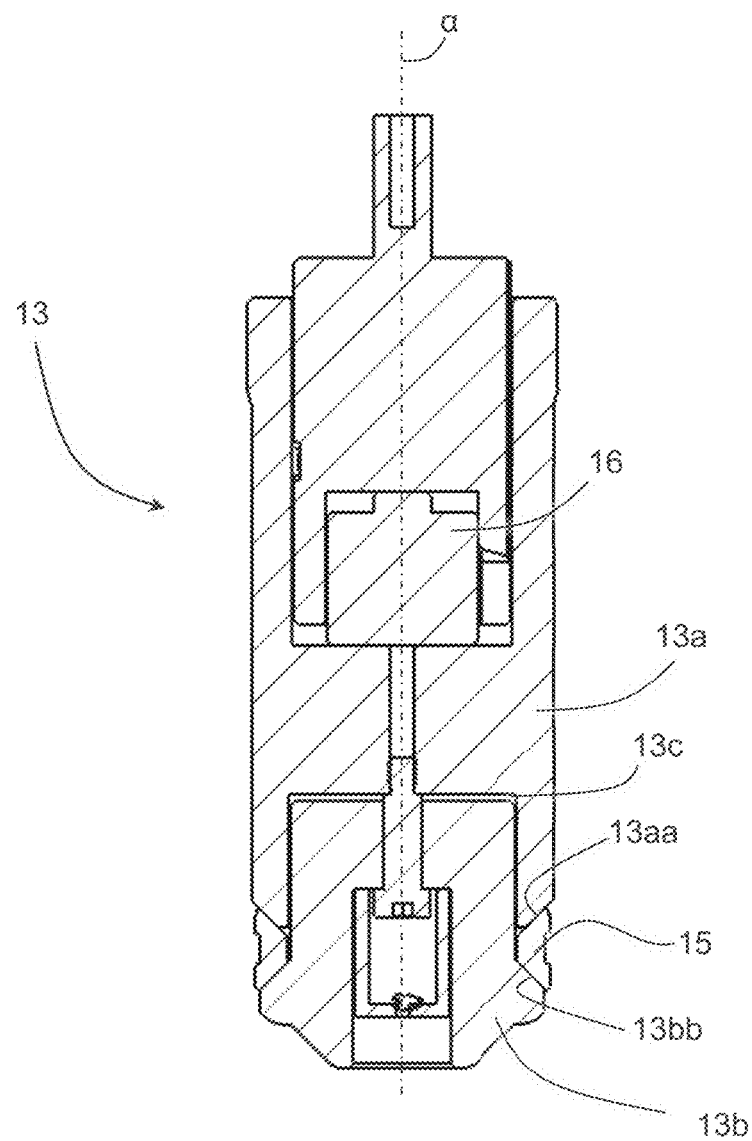
FIG. 8 illustrates a cross-sectional view of an exemplary plunger.

FIG. 8 illustrates a cross sectional view of an exemplary plunger 13. The machine 1 may be operated around the clock within a typical retail environment. As such, it is important to prevent leakage of frozen dessert because it may impair the normal function of the machine 1, in turn adversely impacting the quality of the dispensed product or the overall effectiveness of the dispensing device. The design of the plunger 13 mitigates leakage.

The plunger 13 may include an upper plunger portion 13a, a lower plunger portion 13b, and an elastomeric ring 15 disposed therebetween. The upper plunger portion 13a may have an angled surface 13aa that engages the elastomeric ring 15 from the top. The lower plunger portion 13b may have an angled surface 13ba that engages the elastomeric ring 15 from the bottom. The upper plunger portion 13a and the lower plunger portion 13b may be resiliently connected with a gap 13c therebetween such that, when the plunger 13 exerts axial force on the piston 11, the upper plunger portion 13a and the lower plunger portion 13b are urged towards each other to at least partially close the gap 13c. Similarly, the first angled surface 13aa and the second angled surface 13ba are urged towards each other, axially compressing the elastomeric ring 15, thereby causing the elastomeric ring 15 to expand radially outwards against the inner wall of the piston 11. This forces the outer wall of the piston 11 against the bore 7b of the tube 7 of the cartridge 5, which promotes sealing between the piston 11 and the bore 7b of the cartridge 5, thereby preventing leakage of the frozen dessert therebetween.

The dynamic sealing/force feedback nature of the plunger 13 exists in the fact that more force against the plunger 13, typically the result of colder, harder frozen dessert, will cause the radial expansion of the elastomeric ring 15 to be more forceful. Therefore, colder, harder frozen dessert, which is more likely to by-pass the piston 11 due the high-pressure build-up, will cause an increase in the sealing pressure. Conversely, warmer, softer frozen dessert will flow from the cartridge 5 with less plunger 13 force, which will result in lesser build-up of radial force on elastomeric ring 15 between the bore 7*b* of the tube 7 and the piston 11. In this case, despite the lower sealing pressure, the warmer frozen dessert will not build up sufficient pressure to breach the piston 11 to tube 7 seal as it will tend to exit the cartridge 5 through the path of least resistance, specifically the nozzle opening 9*c*.

The plunger 13 may also include an electro-mechanical force sensing device 16 capable of monitoring the compression force level of the plunger 13 during the dispensing process. The output of the force sensing device 16 is readable by a motor controller capable altering the power input to the motor 38. The sensing of a force level in excess to a pre-defined safe limit may result in the reduction of power to the motor 38 with the intended effect of reducing mechanical stresses in both the drive system, plunger 13 and cartridge 5. Conversely, the sensing of a force level below a pre-defined safe limit during dispensing may result in the increase of power to the motor 38 with the intended effect of accelerating the dispense process while maintaining mechanical stress below or equal to a pre-defined safe limit.

FIGS. 9-15 illustrate cross-sectional side views of the machine 1 to illustrate a method of dispensing frozen dessert using the machine 1.

Figure 9:
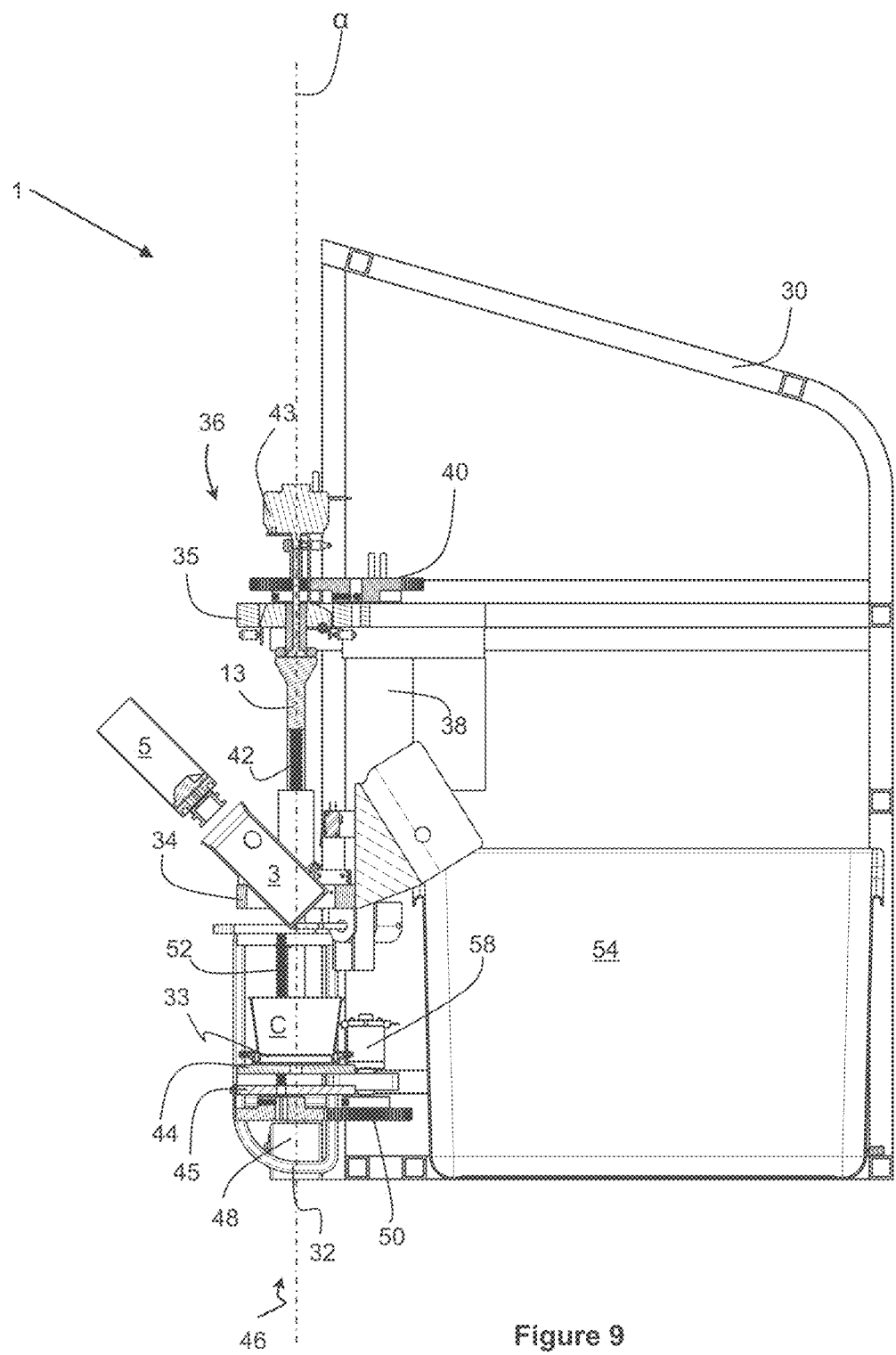
FIG. 9 illustrates loading of a cartridge into the machine of FIGS. 2A and 2B.

FIG. 9 illustrates loading of the cartridge 5 into the machine 1. As described above, the cartridge cart 3 is tiltably mounted to the first vertically moving structure 34 to tilt such that the top opening 3*b* moves towards the front of the machine 1 to allow for user insertion of the cartridge 5 into the cartridge cart 3. Once inserted, the nozzle neck 9*b* of the cartridge 5 protrudes through the bottom opening 3*c* and the nozzle shoulder 9*a* rests on the support wall 3*d* of the cartridge cart 3. After the user inserts the cartridge 5 into the cart 3, the user may close the door 4 of the machine 1 and may also press Start on the controls 8 of the machine 1 to get the automatic part of the process started.

Figure 10:
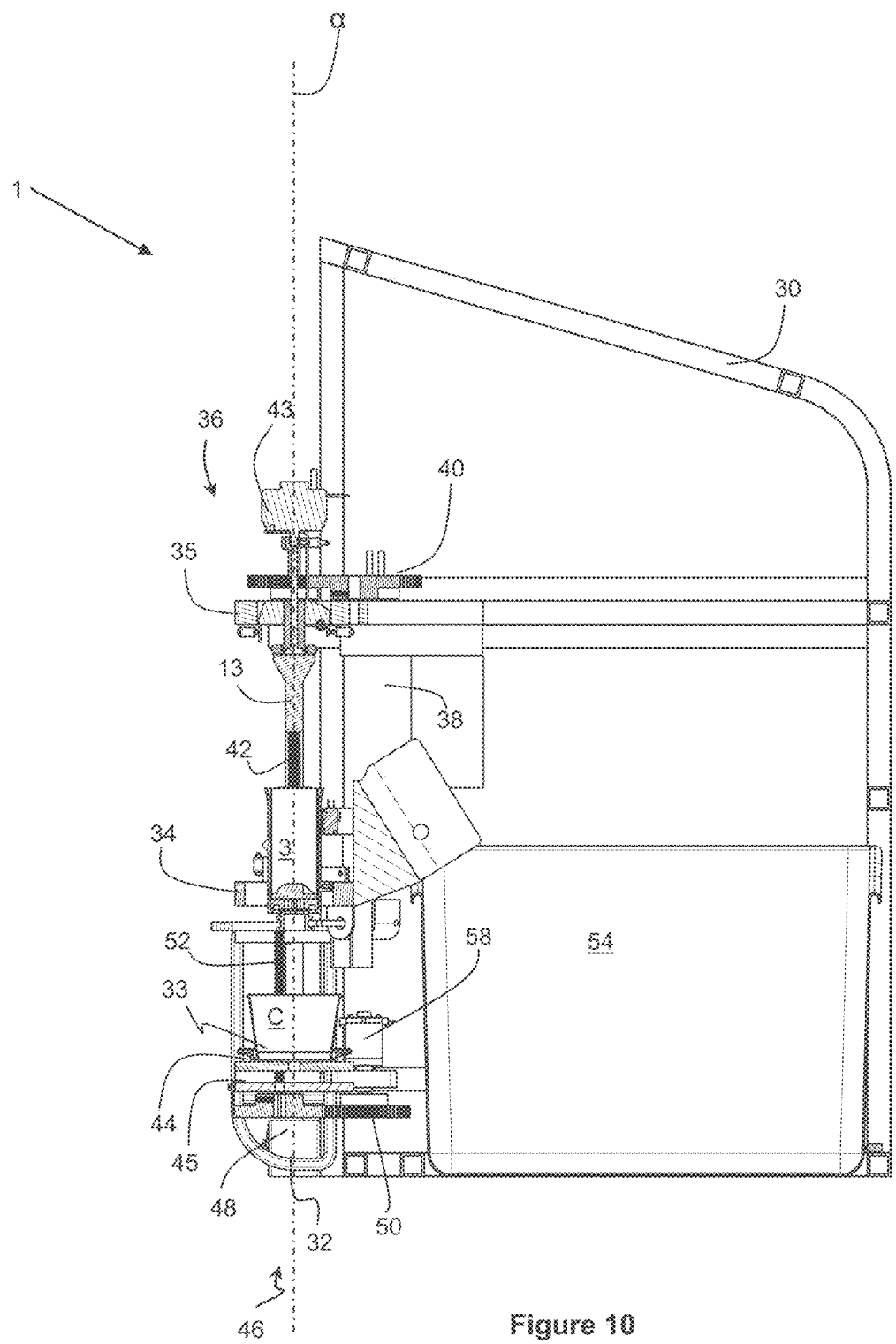
FIG. 10 illustrates start of the automatic portion of the frozen dessert dispensing process.

FIG. 10 illustrates start of the automatic portion of the frozen dessert dispensing process. From the outwardly tilted position of FIG. 9, the cartridge cart 3, carrying the cartridge 5, may then tilt in the opposite direction such that the top opening 3*b* moves to a position in which the cartridge cart 3 and the piston 11 are axially aligned with the plunger 13. Before dispensing of the frozen dessert, however, the machine 1 removes the cap 23 of the cartridge 5.

Figure 11:
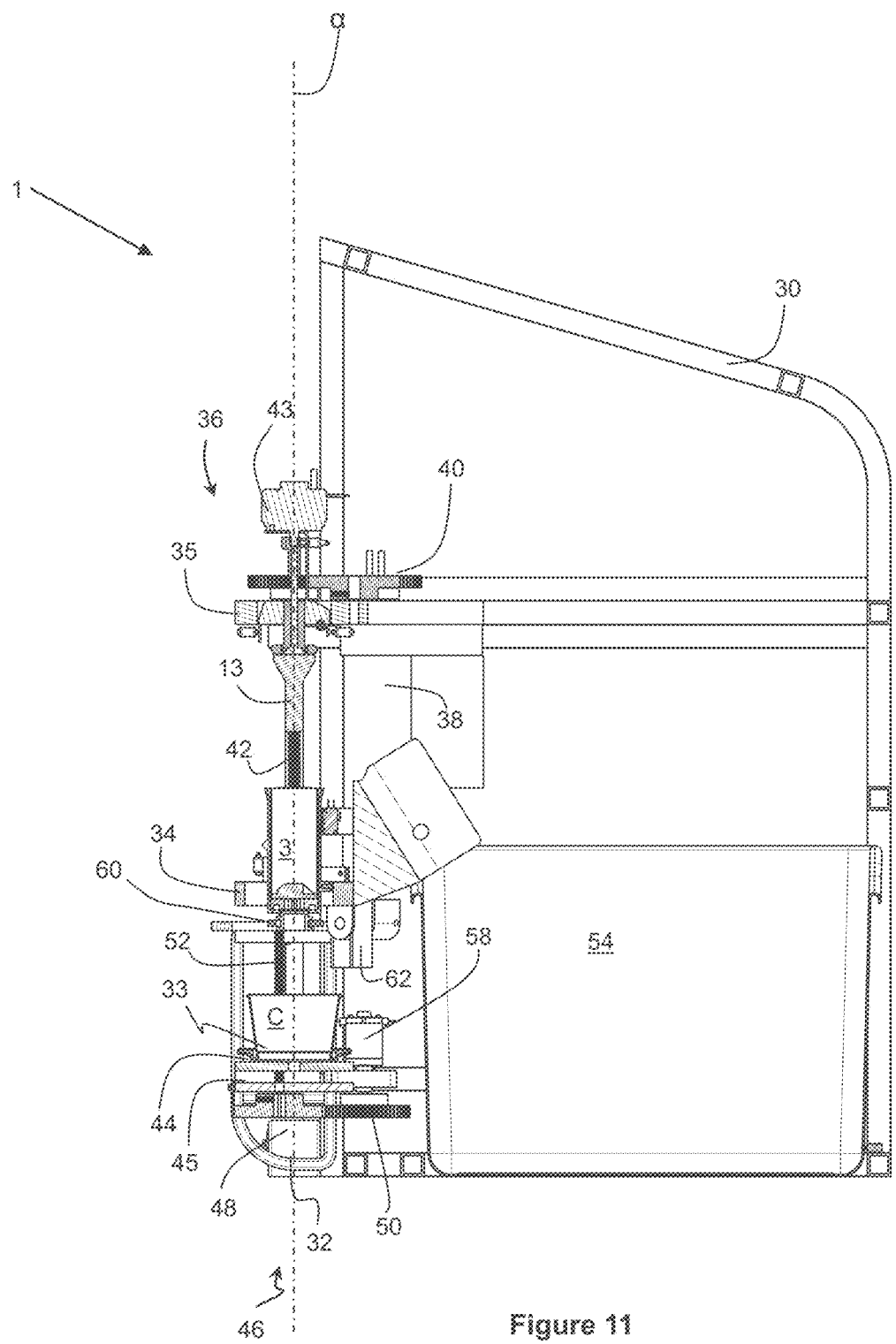
FIG. 11 illustrates engagement of a cap grasper to a cap of a cartridge.

FIG. 11 illustrates engagement of a cap grasper 60 to the cap 23. The vertically moving structure 34 includes a servo 62 that moves the cap grasper 60 horizontally forward to engage the cap 23 at a groove of the cap 23.

Figure 12:
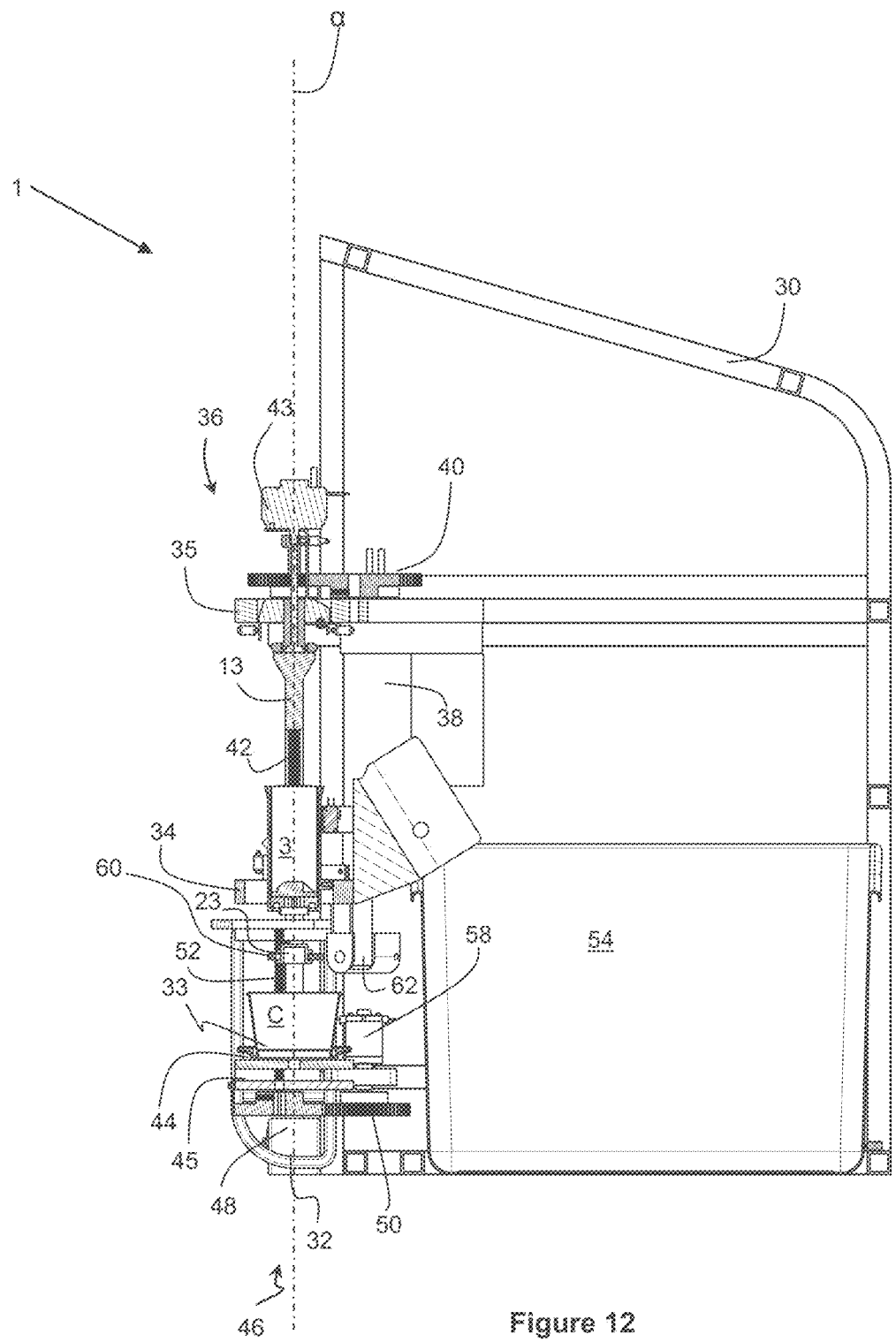
FIG. 12 illustrates removal of the cap of the cartridge.

FIG. 12 illustrates removal of the cap 23. The cap grasper 60, after engaging the cap 23, may be moved vertically downward to remove the cap 23 from the cartridge 5. The cap 23 may be installed to the cartridge 5 by means of an interference engagement and the cap grasper 60 may apply adequate axial force downward to break the interference engagement while nozzle shoulder 9*a* rests on the support wall 3*d* of the cartridge cart 3.

Figure 13:
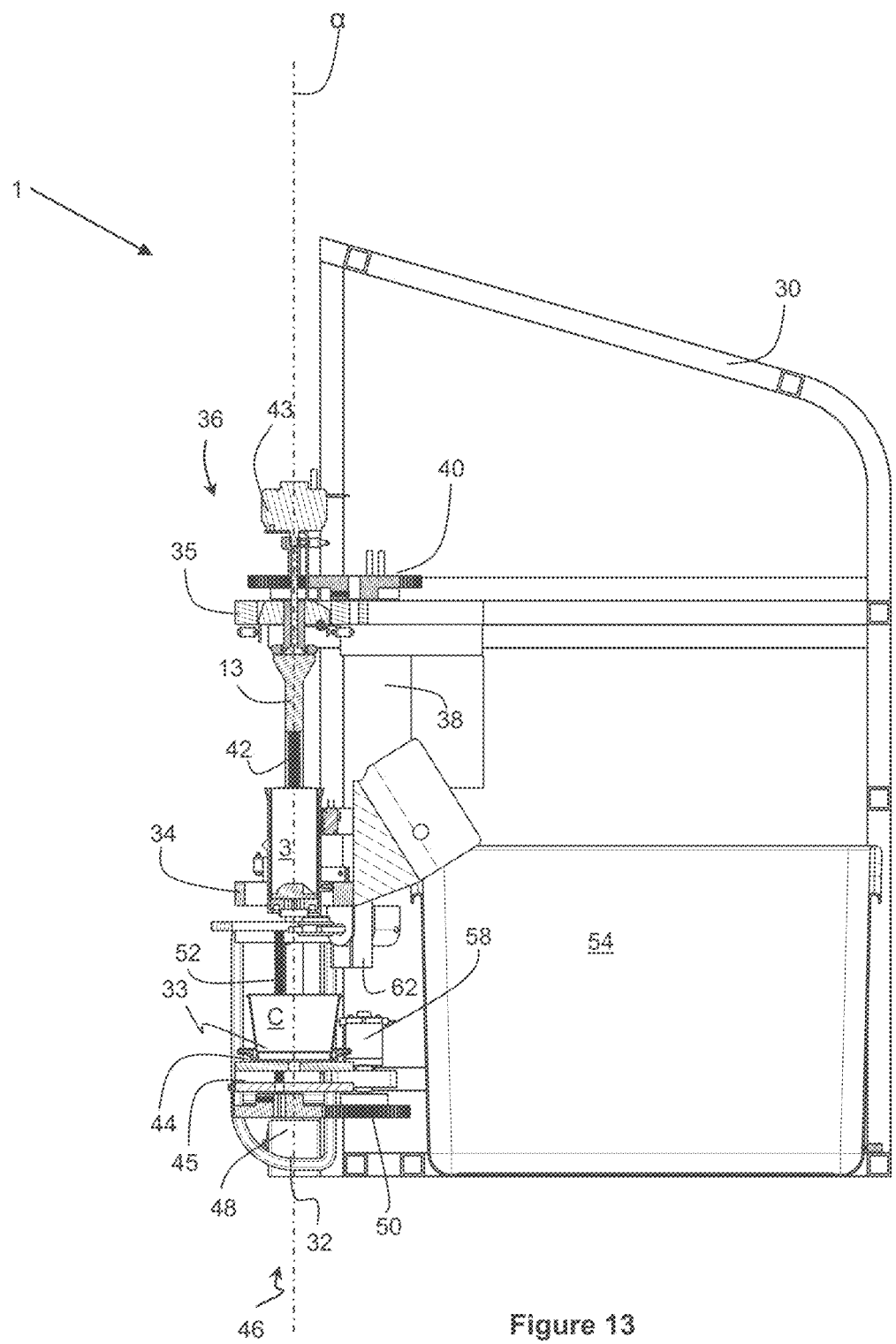
FIG. 13 illustrates the cap grasper moved horizontally to move the cap away from the path of the frozen dessert.

FIG. 13 illustrates the cap grasper 60, after removal of the cap 23, moving horizontally to move the cap 23 away from the path of the frozen dessert towards the back of the machine.

Figure 14:
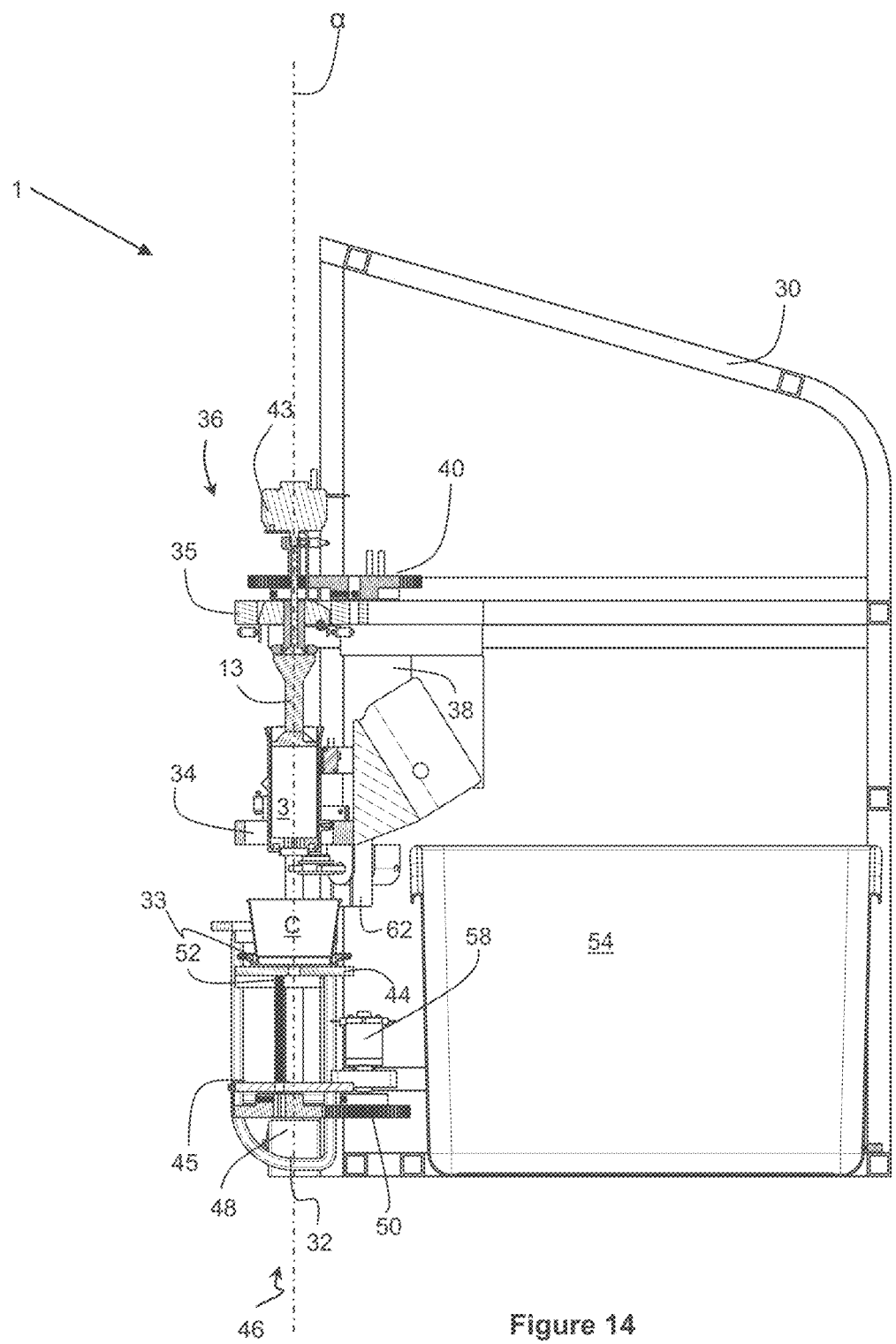
FIG. 14 illustrates engagement of a cartridge's piston and a plunger.

FIG. 14 illustrates engagement of the piston 11 and the plunger 13. The drive source 36 moves the first vertically moving structure 34 vertically upwards vertically moving the cartridge cart 3 such that the plunger 13 enters the opening 3*b* at the top end. Eventually, the plunger 13 engages the piston 11 and pushes the piston 11 along the central axis α while the support wall 3*d* moves up vertically against the shoulder 5*a* of the cartridge 5 thereby pushing the frozen dessert through the nozzle 9.

At the same time, the second drive source 46 drives the second vertically moving structure 44 vertically upwards while the turntable 33 turns. Thus, the machine 1 simultaneously rotates and moves upwardly the dessert cup C. This simultaneous motion results in the at least some of the frozen dessert pushed through the nozzle 9 being dispensed into the dessert cup C in a twirly, spiral shape. In one embodiment, the first vertically moving structure 34 moves up vertically at a different speed from that of the second vertically moving structure 44.

Figure 15:
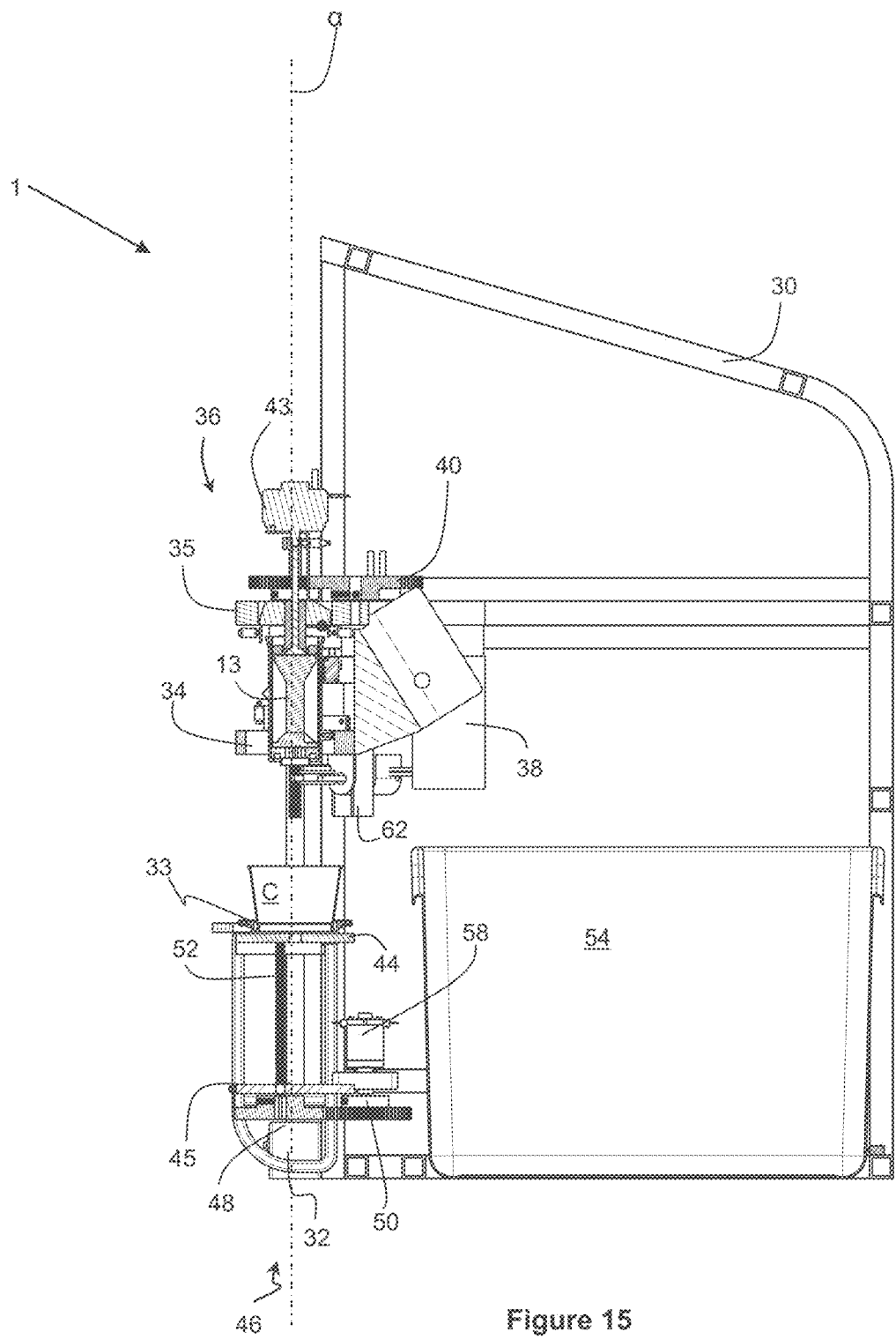
FIG. 15 illustrates the conclusion of the dispensing part of the process.

FIG. 15 illustrates the conclusion of the dispensing part of the process. The piston 11 reaches the nozzle 9 thereby extracting much of the frozen dessert previously in the cartridge 5.

Figure 16A:
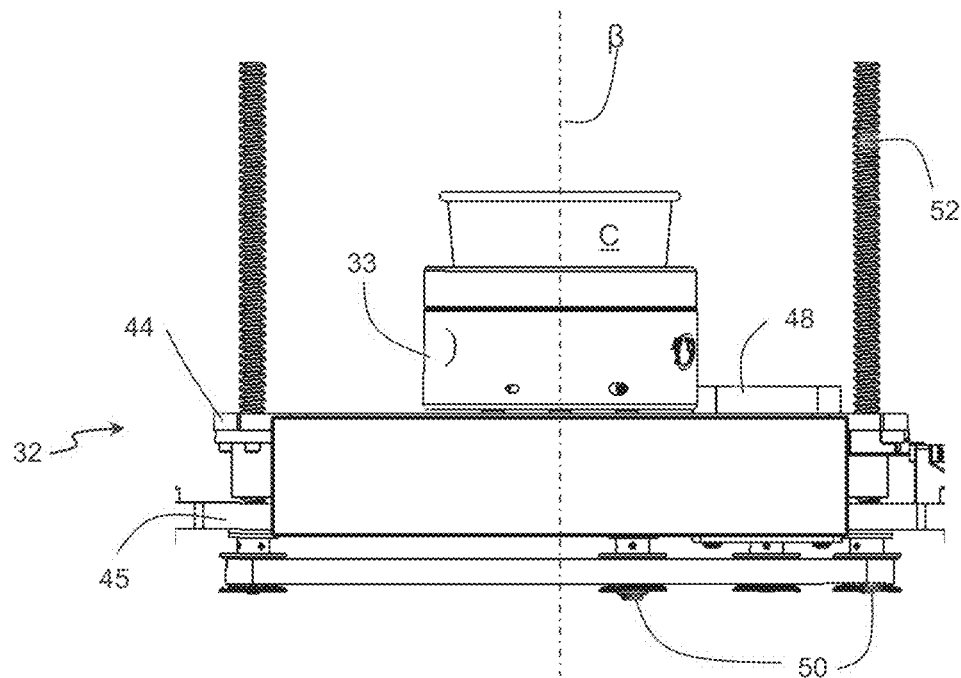
FIGS. 16A, 16B, 16C, and 16D illustrate a front, cross-sectional, bottom perspective, and top perspective views, respectively, of an exemplary cup position mechanism.
Figure 16B:
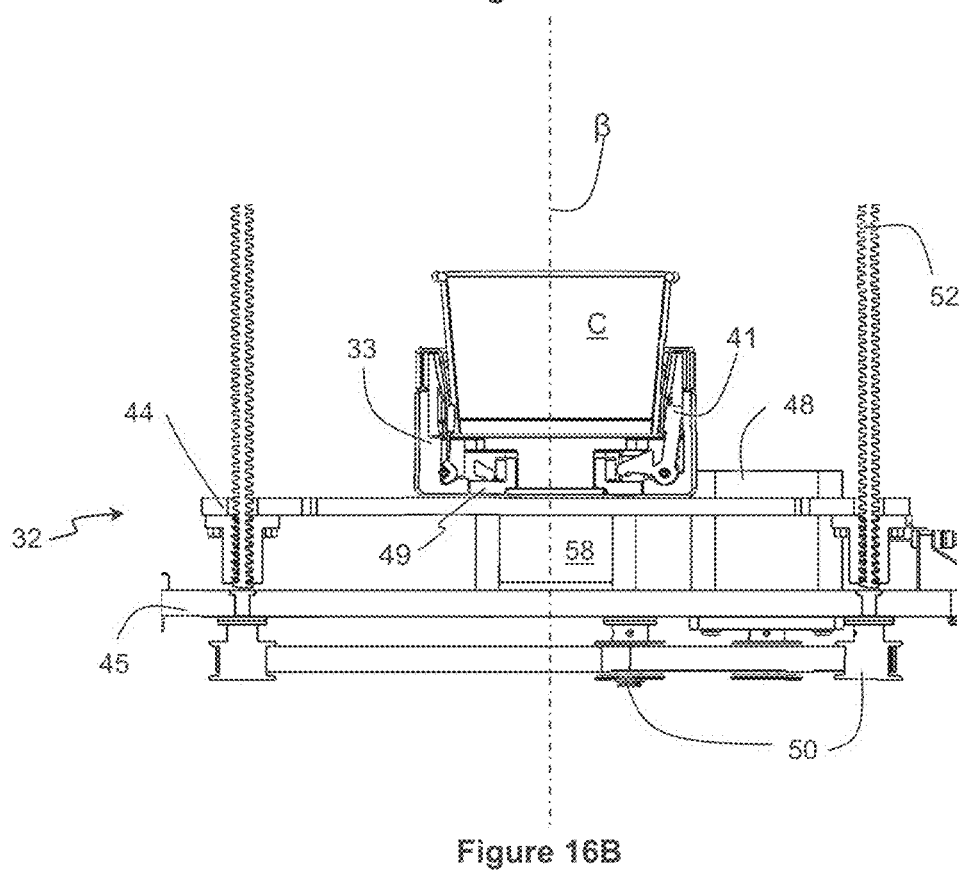
Figure 16C:
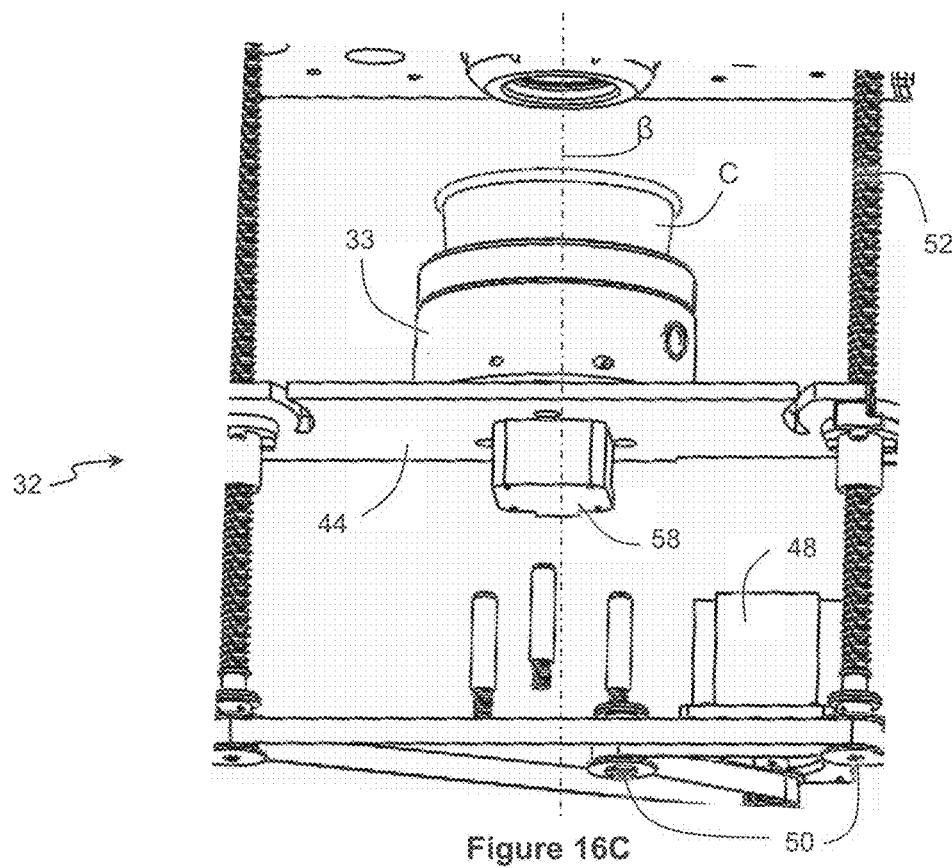
Figure 16D:
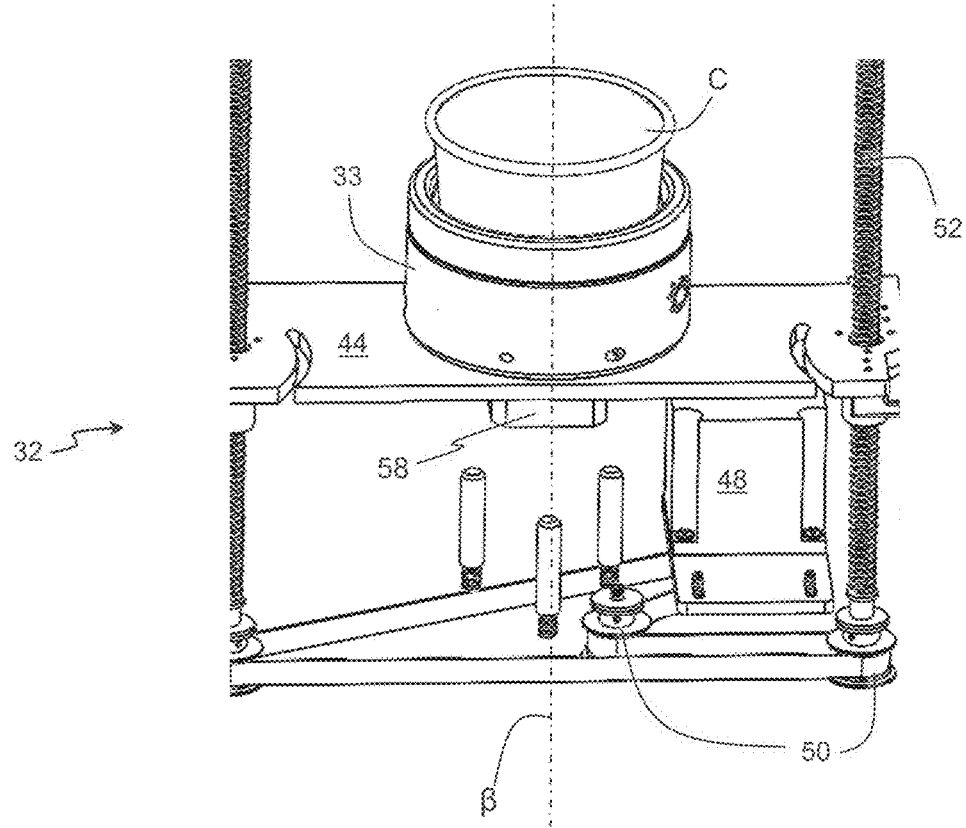
Figure 16E:
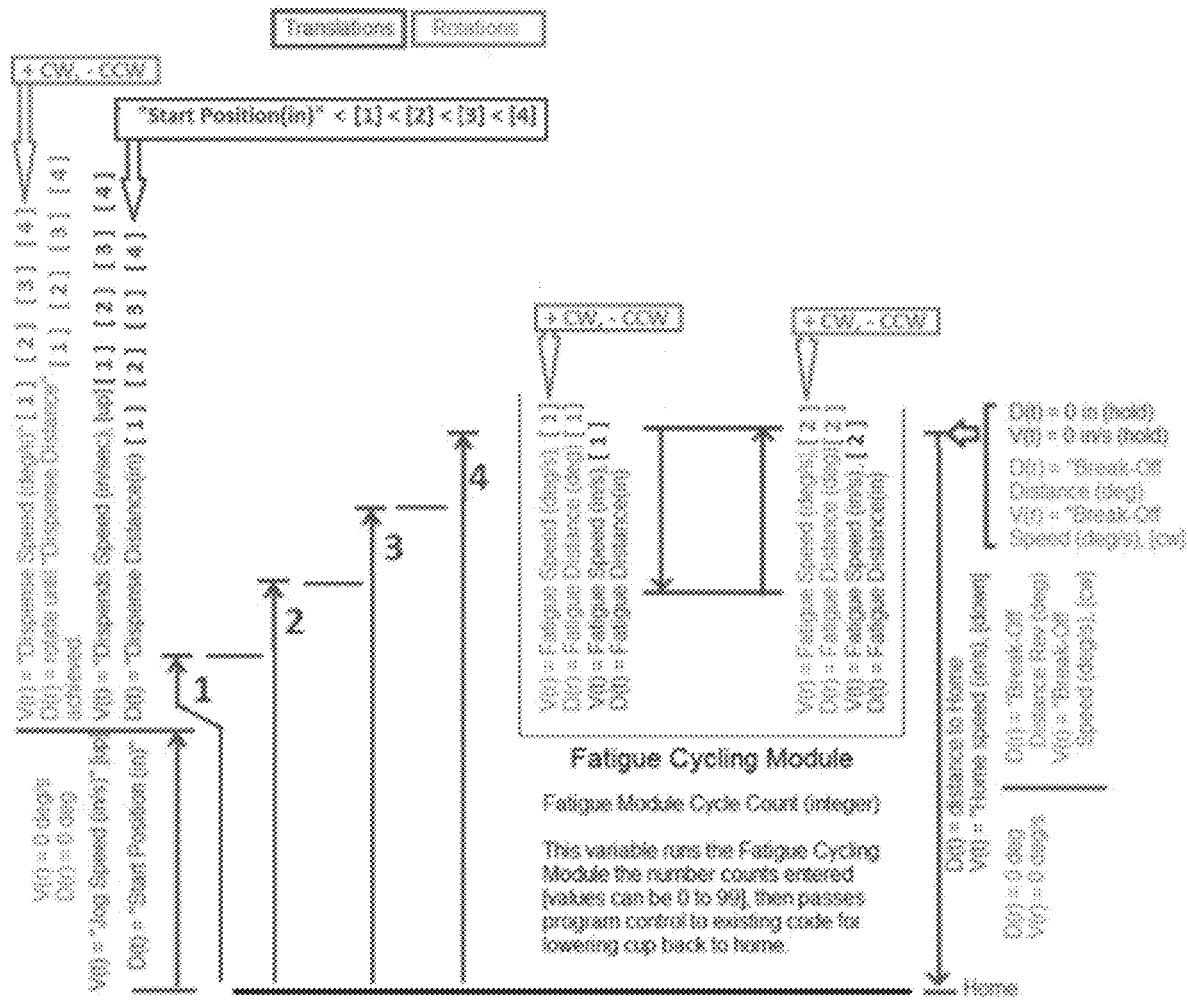
FIG. 16E illustrates a chart of an exemplary process for controlling the exemplary cup position mechanism.
Figure 16F:
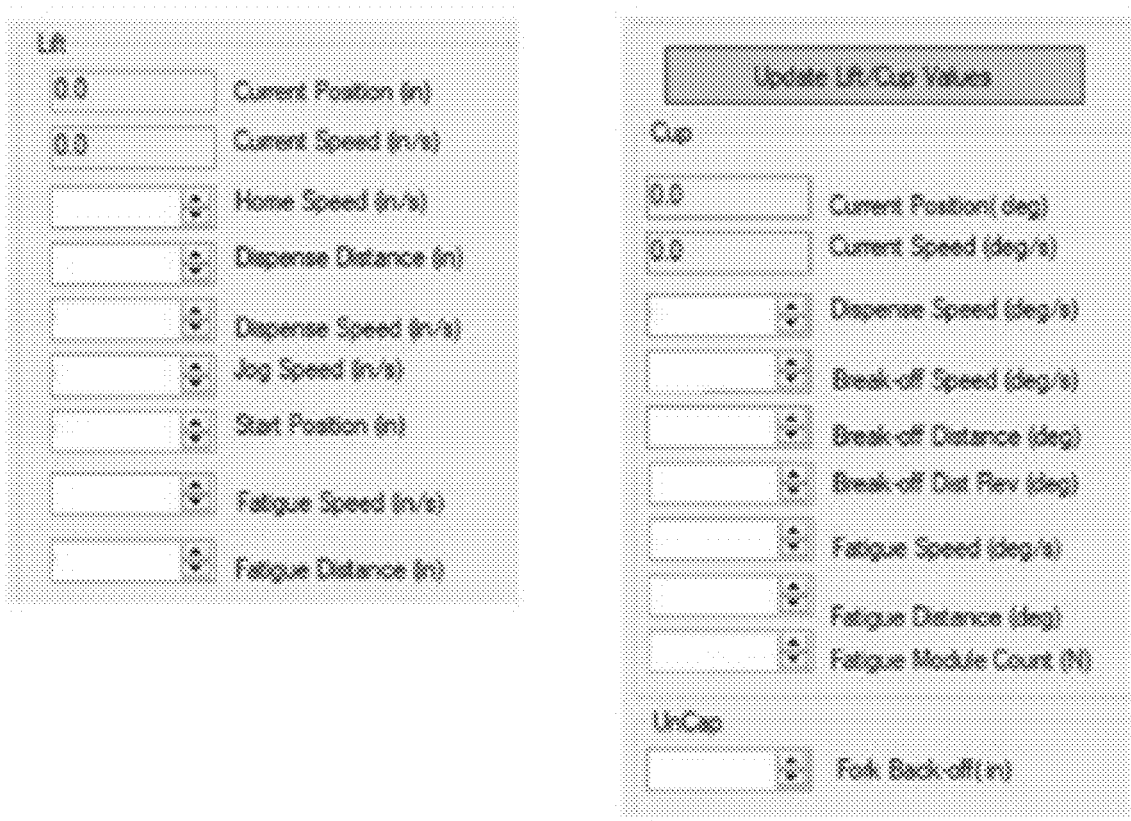
FIG. 16F illustrates an exemplary interface for controlling the exemplary cup position mechanism.

FIGS. 16A and 16B illustrate front and cross-sectional views of the frame 32 in the home position. The frame 32 with its constituent elements represents a cup position mechanism configured to support and transport the cup C provided to receive the individual portion of the frozen dessert. The cup position mechanism 32 lifts the cup C along the central axis β from a home position to one or more dispense positions. In some embodiments, the central axis β of the cup C may coincide with the central axis α of the cartridge 5 while in others the central axis β of the cup C may be horizontally offset from the central axis α of the cartridge 5. This may be done so that frozen dessert may be dispensed distributed evenly inside the cup C and not just at the center of the cup C. The cup position mechanism 32 may also rotate the cup C to help shape the frozen dessert as it dispenses into the cup C. FIGS. 16C and 16D illustrate top perspective and bottom perspective views of the frame 32 lifting the cup C from the home position to one or more dispensing positions. FIGS. 16E and 16F illustrate a control system/process for the cup position mechanism 32.

A potential problem with dispensing frozen dessert in the manner described herein is that spillage may occur as the cup C may not be at the right distance/position from the nozzle 9 at some stages of the dispense cycle. However, in the device 1 of the present invention, the cup position mechanism 32 may lift/lower and rotate the cup C as necessary along the dispense cycle to ensure the cup C is always as the correct position to avoid spillage. The cup position mechanism 32 may lift the cup C towards the dispensing nozzle 9, which itself is in motion, and then dynamically maintain a position relative to the dispensing nozzle 9 determined to yield a desirable dispense finish. The device 1 and/or the cup position mechanism 32 may include a computer program that determines correct positions, speeds, and rotations along the dispense cycle.

The device 1 and/or the cup position mechanism 32 may also provide post-dispensing motion of the cup (rotational and/or translational) for neat break-off of the frozen dessert at the nozzle 9. The cup position mechanism 32 may translationally and rotationally move the cup C, again, relative to the nozzle 9, as deemed necessary to cause separation of the ice cream from the nozzle 9 and yield a desirable dispense finish. Finally, the cup position mechanism 32 may return the cup C to the unload/reload position (i.e., the home position) to be removed by the user after the frozen dessert has been dispensed.

The cup position mechanism 32 may have built thereon a second vertically moving structure 44 and a second fixed structure 45. The second vertically moving structure 44 carries the turntable 33 on which the cup C rests for receiving the frozen dessert expelled from the cartridge 5. The second vertically moving structure 44 may also include a motor 58 for turning the turntable 33. The second fixed structure 45 carries the second drive source 46. The drive source 46 may include a motor 48, gears 50, and lead screws 52. Actuating the second drive source 46 causes the second vertically moving structure 44 to move vertically relative to the second fixed structure 45. Therefore, actuating the second drive source 46 causes the cup C to move vertically relative to the plunger 13 while turning the turntable 33.

Multiple control segments allow programming of fine motions of the cup C, both translational and rotational. The cup position mechanism 32 may divide the dispense process into four increments (aka, positions) as shown in FIG. 16E. Each increment has specified distance, speed and rotational values that may be programmed using the interface of FIG. 16F. Setting the program/controller to specific values allows control over the cup position mechanism 32 as different positions require different speeds and rotations in order to deposit the frozen dessert into the cup C in a desired way.

To start a dispense, the cup position mechanism 32 may lift from the home position to a start position. This motion may be generated by translation only; no rotational movement is necessary to bring the cup C to the start position. Distance and speed are defined by start position and jog speed, respectively. Once the cup C is at the start position and with the help of the controller/program, the cup position mechanism 32 may lift the cup C to the next position i.e., the dispense position #1. The dispense position is determined by the dispense distance in inches. At this point, rotational movement may begin to shape the frozen dessert being dispensed into the cup C. The cup position mechanism 32 may continue to lift the cup C from dispense position #1, to dispense position #2, to dispense position #3, and to dispense position #4. In general, the cup position mechanism 32 lifts the cup C to follow the lifting motion of the nozzle 9 up to dispense position #4, although not necessarily at the same pace or distance.

At dispense position #4, dispensing of the frozen dessert may be complete but some frozen dessert may still be connected from the nozzle 9 to the cup C. To sever any still connected frozen dessert, a new motion called Fatigue Cycling Mode motion may be introduced. This motion alternatively lifts up the cup C and lowers it down and/or alternatively rotates the cup C clockwise and counterclockwise (i.e., twisting and untwisting) to fatigue any frozen dessert that may still be connected from the nozzle 9 to the cup C. This programmed pattern may repeat as necessary, thereby alternately stretching and compressing the frozen dessert to eventually cause it to severe.

Once the frozen dessert is dispensed and the Fatigue Cycling Mode motion has concluded, the cup position mechanism 32 may return the cup C to its initial position (i.e., home or unload/reload position). A user may remove the cup C from the serving area 6 and the machine 1 is ready for another cycle/dispense.

Using the interface shown in FIG. 16F in combination with the chart of FIG. 16E, the device 1 may be used to nearly perfectly control movement (translation and rotational) of the cup position mechanism 32 and the cup C. Moreover, such control may be customizable depending on the specific type of frozen dessert to be dispensed. Thus, a type of frozen dessert such as ice cream may require different distances and speeds of translation and/or rotation to be dispensed into the cup C attractively and neatly as compared to another type of frozen dessert such as frozen yogurt. The device 1 may be configured to obtain information (e.g., using a bar code in cartridge 5, information entered using controls 8, etc.) regarding the specific type of frozen dessert to be dispensed and choose a program including best parameters (dispense positions, translational speeds, rotational speeds, fatigue algorithm, etc.) specifically customized to the specific type of frozen dessert.

When dispensing frozen dessert, it is important to keep the cup C secure to properly shape the frozen dessert within the cup C and to prevent potential spillage. For example, the cup C rotation during the dispense cycle could cause the cup C to tip over due to the initial uneven load. A dislodged cup C could cause spillage of frozen dessert outside of the cup C. Ideally, the cup C should be kept centered and secured to the moving cup holder/turntable 33. And, after dispensing, the user should be able to easily remove the cup C and insert a new empty cup for the next dispense.

Figure 17A:
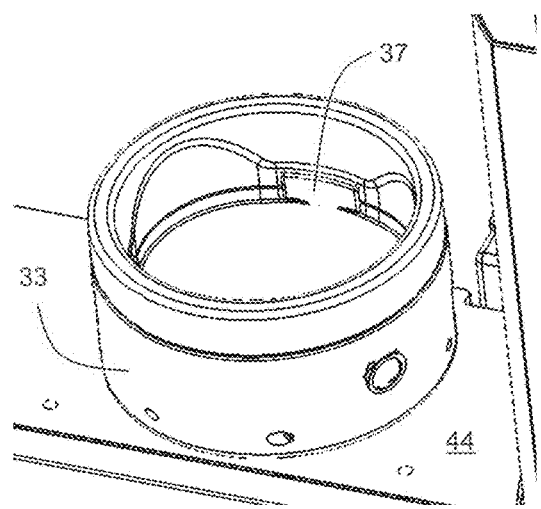
FIGS. 17A, 17B, and 17C illustrate top perspective and cross-sectional views of an exemplary cup holding mechanism.
Figure 17B:
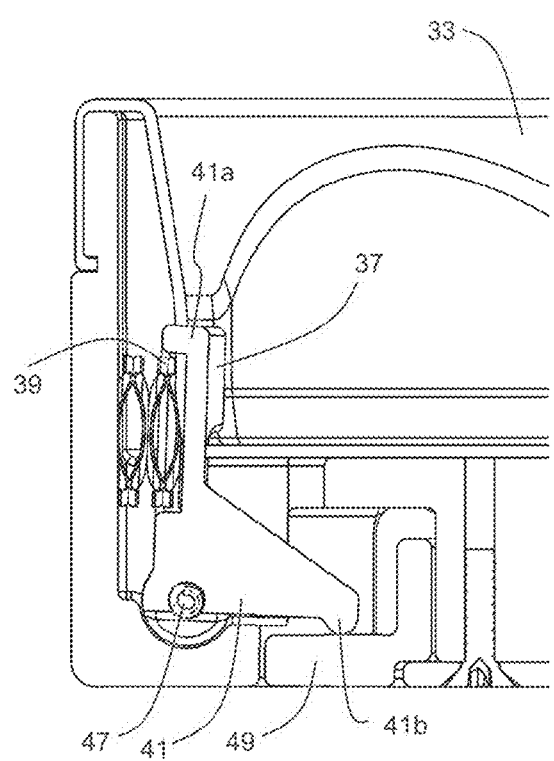
Figure 17C:
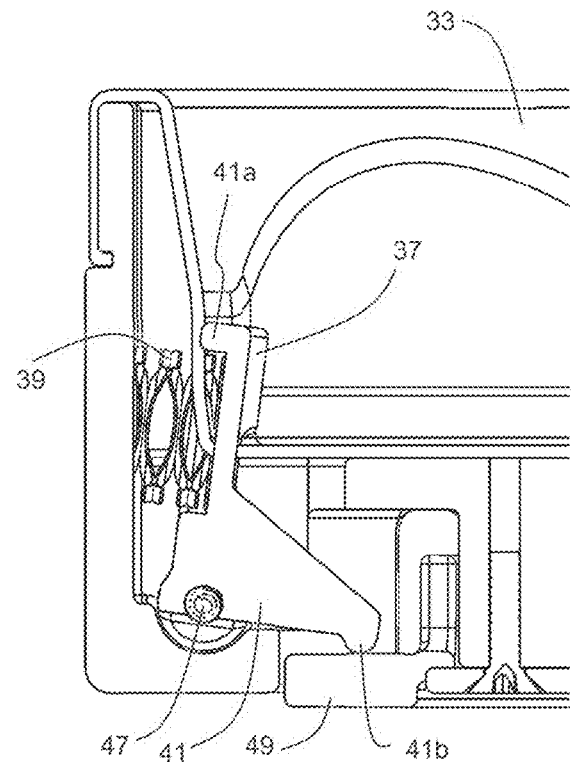

FIG. 17A illustrates a top perspective view of the cup holder/turntable 33. FIG. 17B illustrates a cross-sectional view of the cup holder/turntable 33 in the home position. FIG. 17C illustrates a cross-sectional view of the cup holder/turntable 33 soon after it has been lifted from the home position.

The cup position mechanism 32 may include a cup gripper mechanism, a system within the device 1 that accepts a serving cup C into which frozen dessert will be deposited. The user can easily and intuitively place the cup C in the cup holder/turntable 33 and remove the cup C after dispensing is complete. The cup gripper mechanism is designed to automatically grip the cup C after it is lifted from the home position to one of the dispense positions, as described above. This may allow the cup C to remain secure during the dispensing process, preventing spillage and ensuring the cup C rotates as desired, as described above, to provide the desired appearance. When the cup holder/turntable 33 returns to the home position, the cup gripper mechanism automatically retracts to release the cup C for easy removal of the filled cup and placement of a new, empty cup for the next dispense. This cup gripper mechanism may take advantage of already existing motors of the machine 1; no additional motors would be required beyond those initially implemented for other functions.

The cup gripper mechanism may include three or more spring loaded jaws 37 each configured to, when the cup position mechanism 32 lifts the cup C from the home position, pivot toward the cup C urged by the spring 39 to grip the cup C. When the cup position mechanism 32 returns the cup C to the home position, the jaws 37 pivot away from the cup C to compress the spring 39 and release the cup C. Each of the spring loaded jaws 37 may include a lever member 41 that has a generally vertical lever extremity 41a operably connected to the spring 39 and a generally horizontal lever extremity 41b extending perpendicular to the lever extremity 41a. The two lever extremities 41a, 41b meet at a fulcrum 47 about which the lever member 41 pivots.

The cup gripper mechanism may also include a step 49 that exerts an effort upon the generally horizontal lever extremity 41b when the cup holder/turntable 33 is in the home position causing the generally vertical lever extremity 41a to pivot away from the cup C and compress the spring 39. When the cup position mechanism 32 lifts the cup holder/turntable 33 from the home position, the lever member 41 lifts away from the step 49 thereby releasing the effort from the generally horizontal lever extremity 41b causing the generally vertical lever extremity 41a to pivot toward the cup C urged by the spring 39 to grip the cup C. When the cup position mechanism 32 lifts the holder/turntable 33 from the home position, the step 49 comes out of contact with the stand-off posts 51 (best shown in FIGS. 16C and 16D) statically mounted to the second fixed structure 45, which allows the springs 39 to act upon the vertical lever extremities 41a, in turn allowing the horizontal lever extremities 41b to force step 49 downward through a controlled gap, in turn allowing the vertical lever extremities 41a to move to contact with the cup C.

Figure 18:
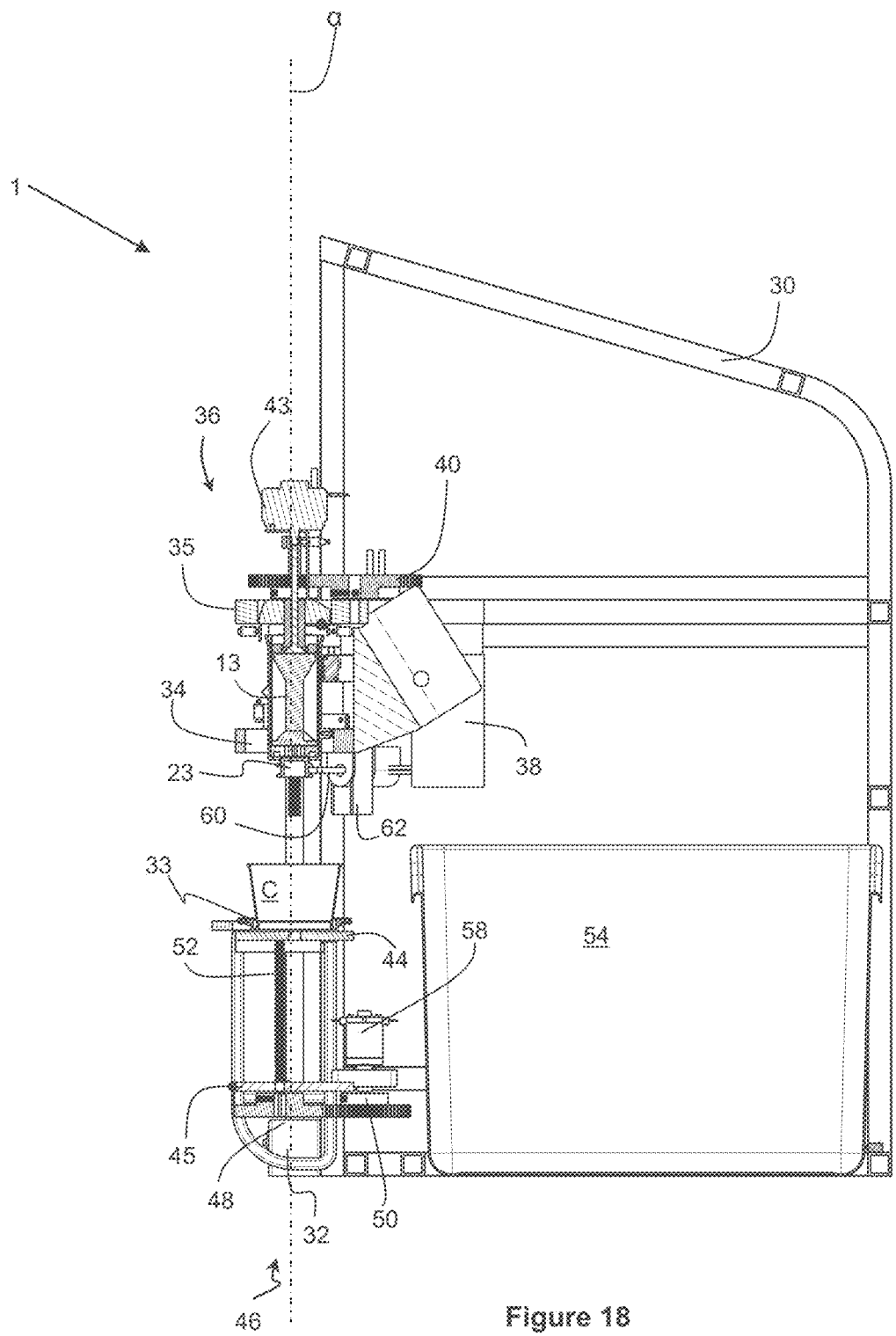
FIG. 18 illustrates reinstalling of the cap onto the cartridge.

FIG. 18 illustrates reinstalling of the cap 23 onto the cartridge 3. Frozen desserts such as ice cream can be messy if not managed properly. Therefore, prior to discarding of the cartridge 3, which may still have some dessert inside, the machine 1 recaps the cartridge 3 to prevent spillage. After the frozen dessert has been dispensed, the cap grasper 60 may move generally horizontally towards the front of the machine 1 and, thereafter, generally vertically e.g., along the axis α towards the cartridge cart 3 to reinstall the cap 23 onto the cartridge 3. In another embodiment, the cap 23 may be disposed into the bin 54 independent of the cartridge 3 and vice versa.

Figure 19A:
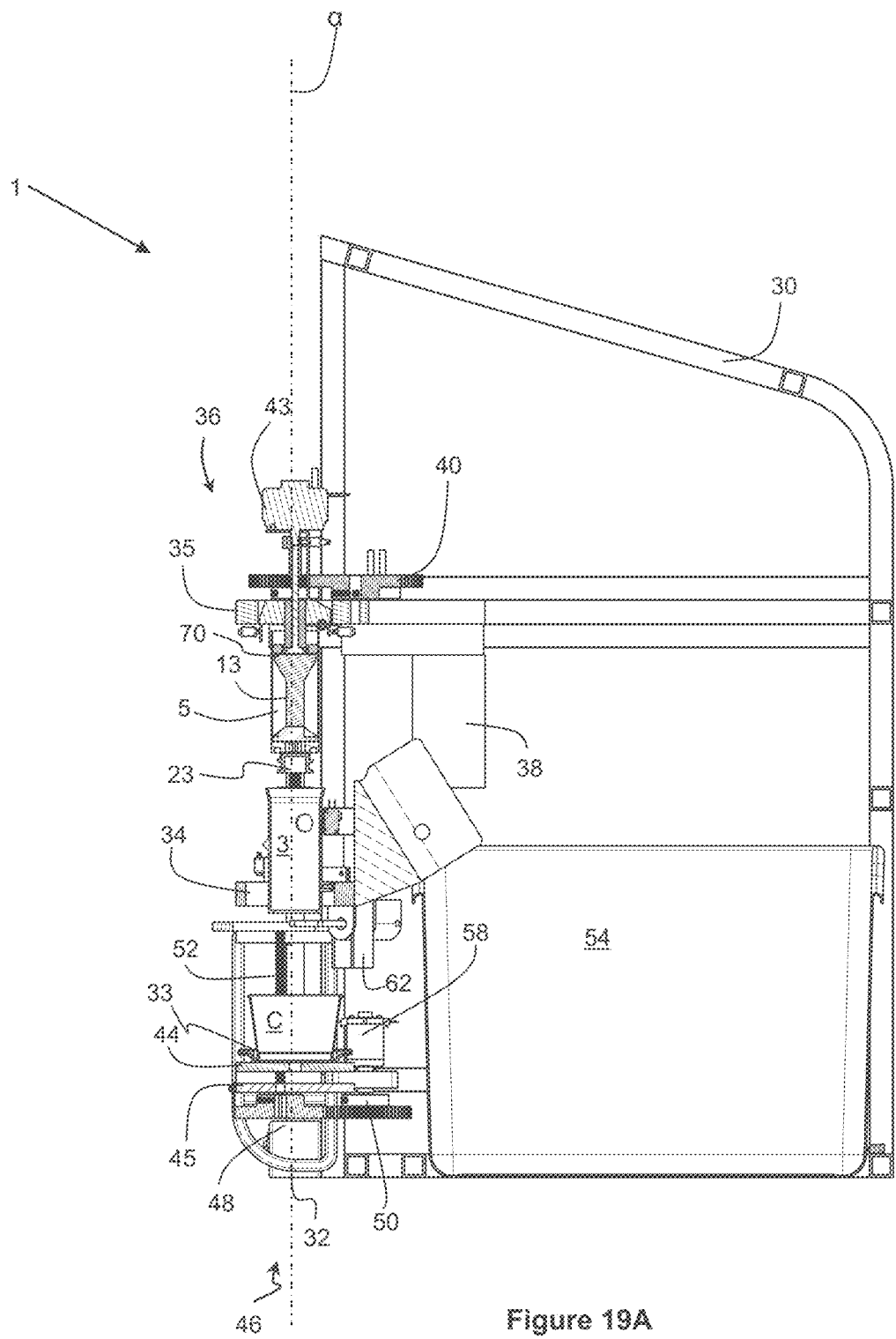
FIG. 19A illustrates gripping of the cartridge to retain it to extract it from the cartridge cart.
Figure 19B:
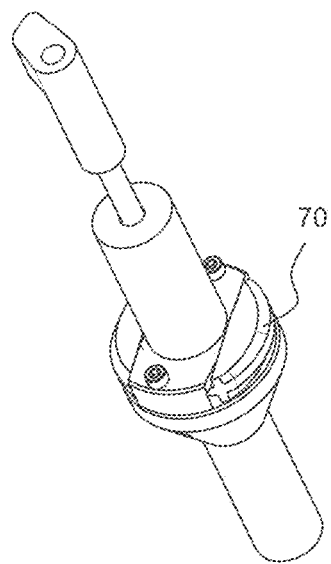
FIG. 19B illustrates a perspective view of the plunger to show more details of the radial grippers.

FIG. 19A illustrates one embodiment of a mechanism for gripping of the cartridge 5 to retain it and, thereby, extract it from the cartridge cart 3 when the cartridge cart 3 moves vertically downward. The plunger 13 may include one or more radial grippers 70 and a servo 43 configured to expand the radial grippers 70 radially within the cylindrical tube 7 to grab the cartridge 5. FIG. 19B illustrates a perspective view of an exemplary plunger 13 to show more detail of the radial grippers 70. The radial grippers 70 may expand radially and grip the cartridge 5 from within to retain it. Actuating the first drive source 36 may cause the first vertically moving structure 34 to move down vertically, thereby vertically moving down the cartridge cart 3 while the radial grippers 70 retain the cartridge 5, thereby extracting the cartridge 5 from the cartridge cart 3.

Figure 20A:
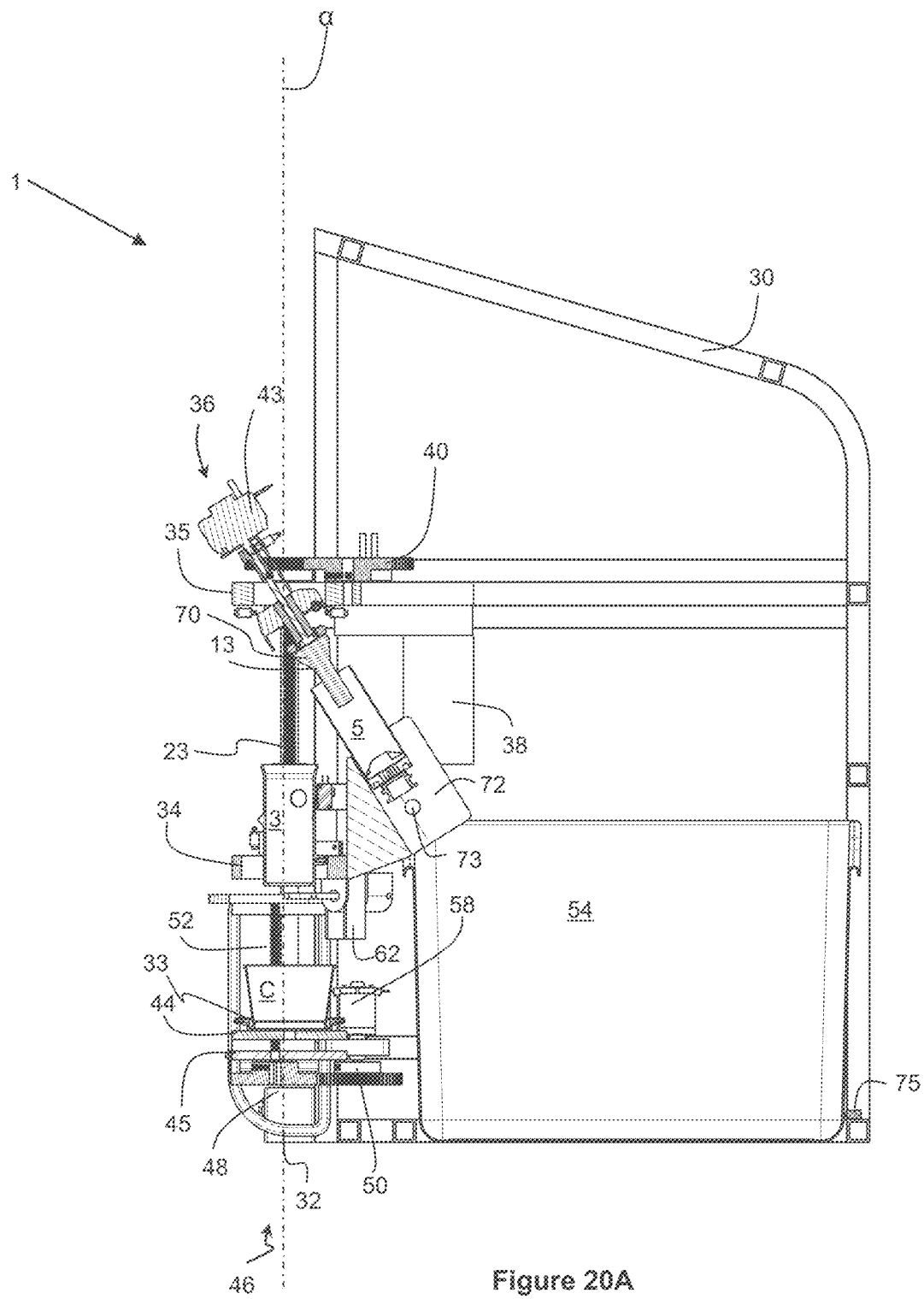
FIG. 20A illustrates an exemplary embodiment of a mechanism for the machine to discard the cartridge.

FIG. 20A illustrates one embodiment of a mechanism for discarding of the cartridge 5 using the radial grippers 70. The plunger 13 may be tiltably connected to the fixed structure 35 and connected to a servo configured to tilt the plunger 13. The machine 1 may include a chute 72 that may decline as it extends away from the front of the machine 1. The high end of the chute 72 may be disposed as to receive the cartridge 5 from the plunger 13 when the plunger 13 is tilted. The low end of the chute 72 may be disposed above the discard bin 54 as to dispatch the cartridge 5 into the bin 54. Once the plunger 13 is tilted as shown in FIG. 20A, the chute 72 may be moved to a position underneath the plunger 13. The radial grippers 70 may then release the cartridge 5 by radially contracting. The chute 72 receives the cartridge 5 and dispatches it into the bin 54. Thereafter, the chute 72 may be moved back to its home position to allow plunger 13 to rotate back to a vertical position. The discard bin 54 may be located within the main frame 30 relative to the chute 72 so as to receive the dispatched cartridge 5. The chute 72 may include a sensor 73 to sense when the bin 54 is full and send a signal to stop operation of the machine 1 and/or alert for maintenance. The machine 1 may include a sensor 75 to sense when the bin 54 is not present and send a signal to stop operation of the machine 1 and/or alert for maintenance.

Figure 20B:
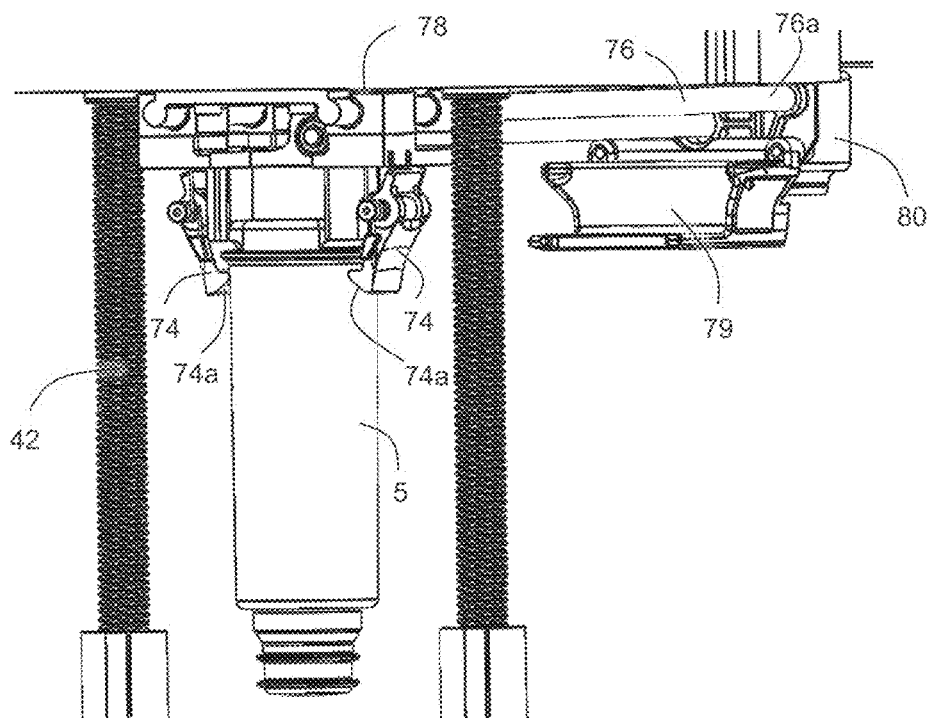
FIGS. 20B and 20C illustrate front and perspective views of another exemplary embodiment of a mechanism for the machine to discard the cartridge.
Figure 20C:
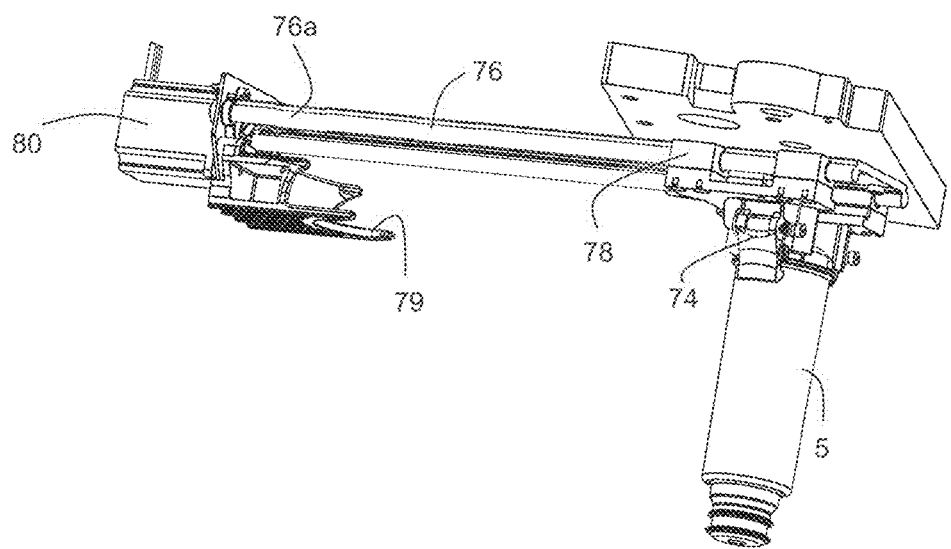

FIGS. 20B and 20C illustrate another embodiment of a mechanism for discarding of the cartridge 5, using the claws 74. In the embodiment of FIGS. 20B and 20C the machine 1 includes a track 76 and a cart 78 that rides on the track 76. The plunger 13 is operably connected to the cart 78 and the cart 78 includes at least two spring-loaded claws 74 forming a claw mechanism. Each claw 74 may have formed thereon a chamfered surface 74a that, in the process of the cartridge cart 3 lifting the cartridge 5 fully to complete dispensing of the frozen dessert, the cartridge 5 may engage the chamfered surfaces 74a to pivotally open the claws 74. The cartridge 5 may have formed thereon a flange or lip 7d that the spring-loaded claws 74 may engage to retain the cartridge 5. The plunger 13 of the embodiment of FIGS. 20B and 20C does not need radial grippers because the claws 74 retain the cartridge 5 instead.

After engagement of the claws 74 to the cartridge 5, the cartridge cart 3 may descend leaving the cartridge 5 behind (i.e., above). The cart 78 powered by a motor 80 may then travel along the track 76 with the cartridge 5 in tow towards the rear of the machine 1. The machine 1 may also include a mounting plate 79 disposed adjacent a rear end 76a of the track 76. The mounting plate 79 may have formed thereon features (e.g., fingers) corresponding to features (e.g., chamfered surfaces) of the spring-loaded claws 74 such that the features of the mounting plate 79 may interact with the features of the spring-loaded claws 74 to open the claw mechanism and thereby release the cartridge 5. The machine 1 may include the chute 72 disposed below the mounting plate 79. The chute 72 may receive the cartridge 5 and dispatch it into the bin 54. The discard bin 54 may be located within the main frame 30 relative to the chute 72 so as to receive the dispatched cartridge 5.

After disposal of the cartridge 5, the cart 78 may return to the front of the machine 1 so that the machine is ready for the next use.

Figure 21:
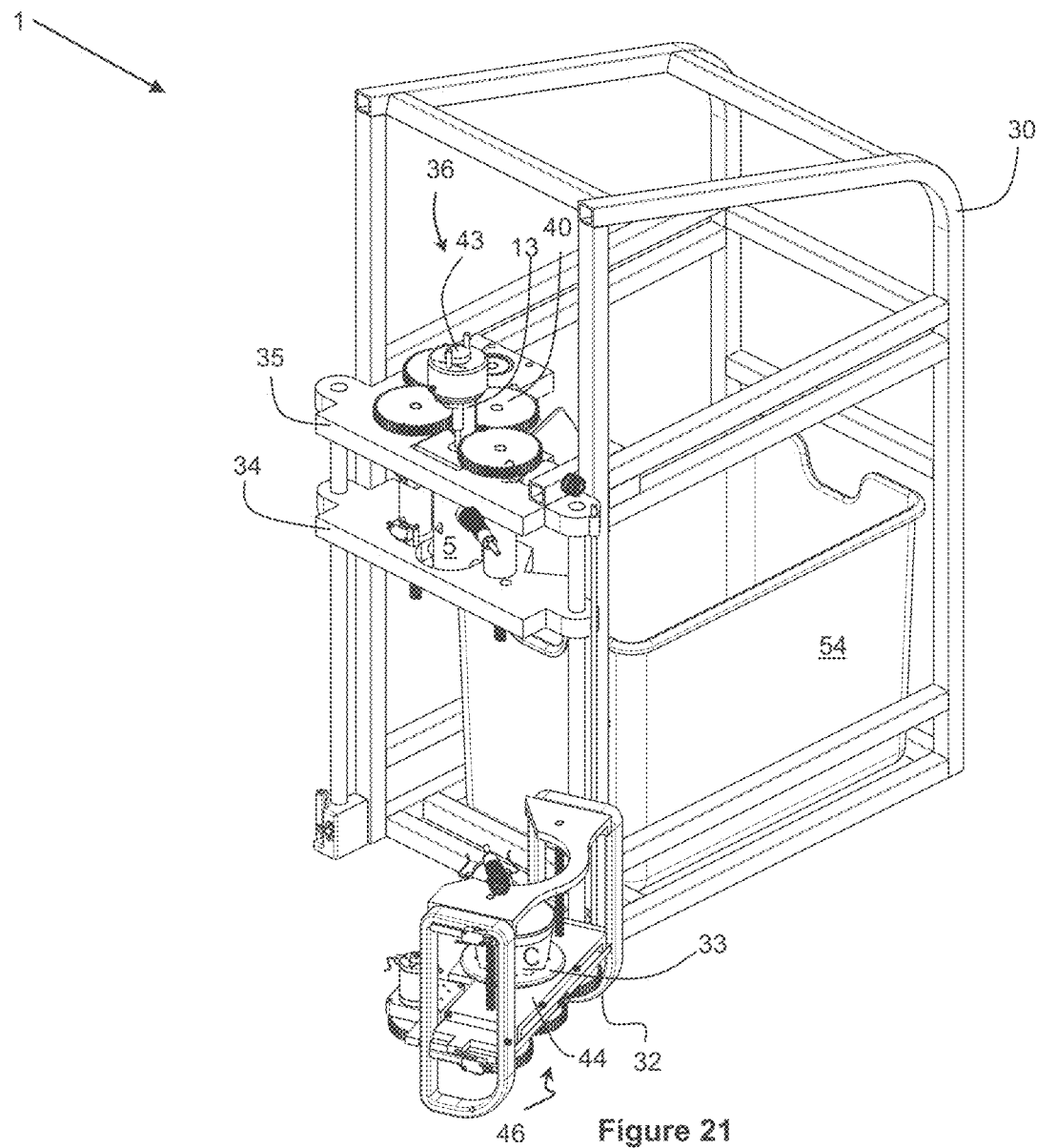
FIGS. 21 and 22 illustrate removal of a discard bin from the machine of FIGS. 2A and 2B.
Figure 22:
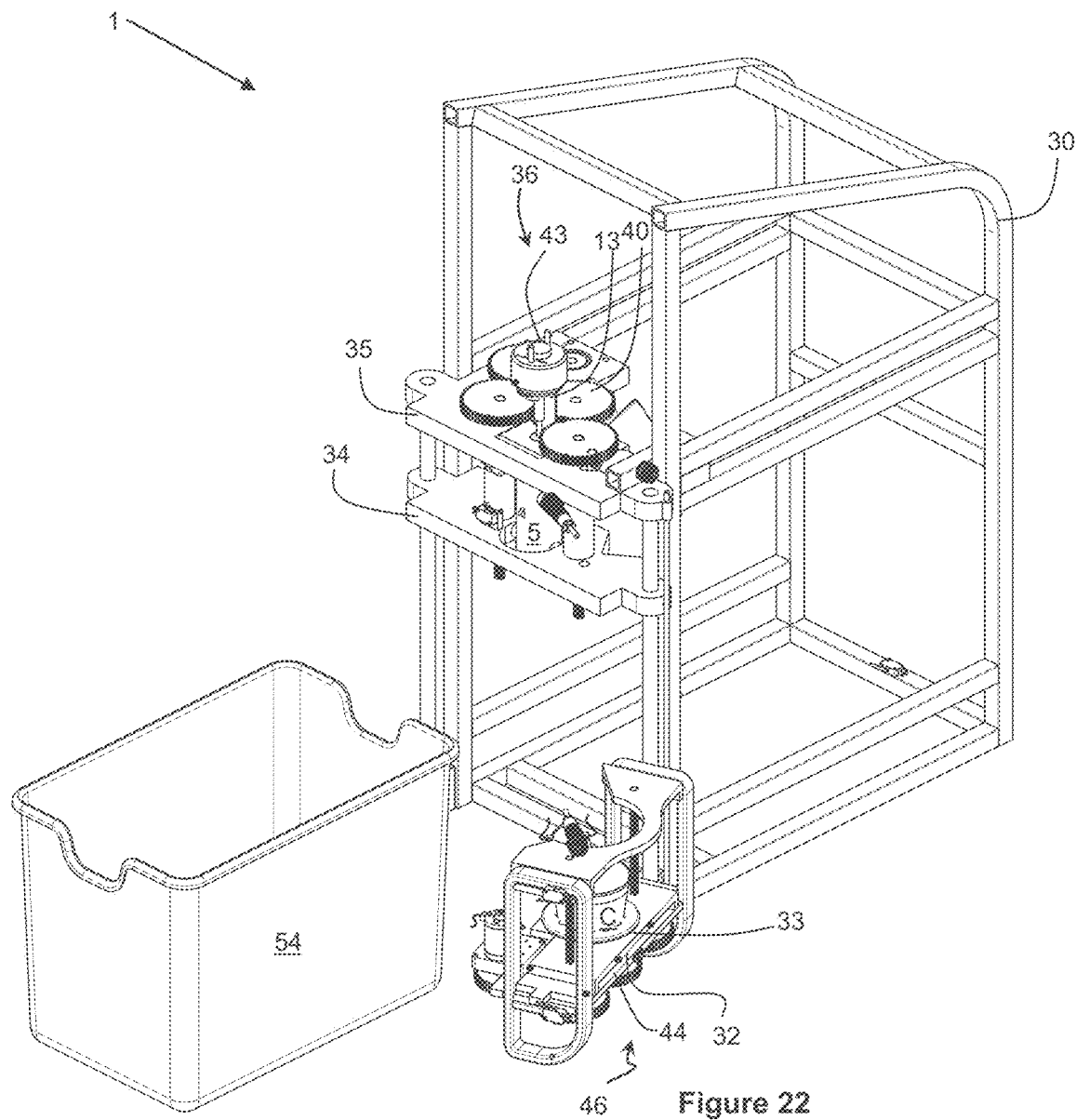

FIGS. 21 and 22 illustrate removal of the discard bin 54. Installation and removal of the discard bin 54 through the side or rear panels of machine 1 may be infeasible as obstructions, such as adjacent machinery or walls, may block such paths. The hinged frame 32 may be hingedly connected to the main frame 30 to pivot relative to the main frame 30. As shown in FIG. 21, in a service mode of the machine 1, the first vertically moving structure 34 moves up vertically relative to the main frame 30 and the hinged frame 32 pivots relative to the main frame 30. This creates an adequate opening that allows frontal removal of the discard bin 54 from within the main frame 30 as shown in FIG. 22.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A machine for dispensing an individual portion of a frozen dessert, the machine comprising:
    a cartridge cart having walls forming a cylindrical cavity having a longitudinal central axis and configured to accommodate a cartridge including a cylindrical tube having first and second ends, a nozzle disposed at the first end, a piston disposed between the nozzle and the second end and configured to slidably move along the cylindrical tube, the frozen dessert contained within the cylindrical tube between the nozzle and the piston;
    a plunger mounted for movement of the cartridge cart relative to the plunger along the central axis or for movement of the plunger relative to the cartridge cart along the central axis;
    a drive source operably coupled to at least one of cartridge cart or the plunger and configured to drive the plunger along the central axis;
    a support configured to support the first end of the cartridge with the plunger in engagement with the piston such that, with the cylindrical tube radially supported by the cartridge cart and axially supported by the support, actuating the drive source causes at least some of the frozen dessert to dispense through the nozzle as the individual portion;
    a first vertically moving structure to which the cartridge cart and the drive source are operably connected, wherein the cartridge cart has an opening at a top end and the support at a bottom end, wherein actuating the drive source causes the first vertically moving structure to move up vertically thereby vertically moving the cartridge cart such that the plunger enters the opening at the top end, engages the piston, and pushes the piston along the central axis while the support moves up vertically thereby pushing the at least some of the frozen dessert through the nozzle; and
    a second vertically moving structure having thereon a turntable configured to accommodate a dessert cup, wherein, in synchronicity with the actuating the drive source, the drive source or a second drive source causes the second vertically moving structure to move up vertically while the turntable turns thereby simultaneously rotating and vertically moving the dessert cup for the at least some of the frozen dessert pushed through the nozzle to be dispensed into the dessert cup.

2. The machine of claim 1, wherein the first vertically moving structure moves up vertically at a different speed from that of the second vertically moving structure.

3. The machine of claim 1, wherein, after the at least some of the frozen dessert is pushed through the nozzle to be dispensed into the dessert cup, the drive source or the second drive source causes the second vertically moving structure to move down vertically while the first vertically moving structure rests or moves down vertically at a slower speed.

4. The machine of claim 1, wherein
    the plunger includes one or more radial grippers configured to expand radially within the cylindrical tube to grab the cartridge; and
    actuating the drive source causes the first vertically moving structure to move down vertically thereby vertically moving down the cartridge cart while the one or more radial grippers of the plunger retain the cartridge thereby extracting the cartridge from the cartridge cart.

5. The machine of claim 4, comprising:
    a chute declining away from the front of the machine from a high end disposed as to receive the cartridge from the plunger to a low end disposed as to dispatch the cartridge away from the front of the machine;
    the plunger configured to tilt in the first direction and, thereafter, release the cartridge by radially contracting the one or more radial grippers;
    the chute configured to receive and dispatch the cartridge away from the front of the machine.

6. The machine of claim 5, comprising:
    a discard bin disposed relative to the chute so as to receive the dispatched cartridge.

7. The machine of claim 6, comprising:
    a sensor configured to sense whether the discard bin is not present or is full and transmit a signal for controlling the machine as to not dispatch the cartridge when the discard bin is not present or is full.

8. The machine of claim 6, comprising:
    a main frame to which the first vertically moving structure is operably connected and within which the discard bin is disposed; and
    a hinged frame to which the second vertically moving structure is operably connected, the hinged frame hingedly connected to the main frame to pivotably move relative to the main frame.

9. The machine of claim 8, wherein in a service mode of the machine the first vertically moving structure moves up vertically relative to the main frame and the hinged frame including the second vertically moving structure pivots relative to the main frame to allow frontal removal of the discard bin from within the main frame.

10. The machine of claim 1, comprising:
    an electronic display that displays instructions to a user as to how to operate the machine; and a proximity sensor configured to detect proximity of a user to the machine and, based on the detected proximity, commence displaying the instructions.

11. The machine of claim 1, comprising:
an enclosure having a front door or opening for inserting the cartridge into the machine, the front door or opening connecting to a passage that leads the cartridge into the cartridge cart.

12. The machine of claim 1, wherein the cartridge cart accommodates a first cartridge for which the cylindrical tube is of a first length and a second cartridge for which the cylindrical tube is of a second length shorter than the first length.

13. The machine of claim 1, wherein the nozzle has a star-shaped opening from which the frozen dessert dispenses through the nozzle, the star-shaped opening formed by nozzle portions whose edges cause friction with the frozen dessert being dispensed causing the frozen dessert temperature to rise.

14. The machine of claim 1, where the piston and the nozzle have corresponding shapes to maximize an amount of the frozen dessert being dispensed from the cartridge.

15. The machine of claim 1, comprising:
a cartridge detector configured to detect information about the cartridge including at least one of:
lot number,
expiration date,
flavor, and
manufacturer.

* * * * *